United States Patent
Hara et al.

(10) Patent No.: US 12,479,940 B2
(45) Date of Patent: Nov. 25, 2025

(54) AMIDE COMPOUND, POLYMERIZABLE COMPOSITION, CURED MATERIAL, AND METHOD OF MANUFACTURING CURED MATERIAL

(71) Applicant: ADEKA CORPORATION, Tokyo (JP)

(72) Inventors: Kenji Hara, Tokyo (JP); Kazuteru Nagasaka, Tokyo (JP); Masatomi Irisawa, Tokyo (JP); Yuji Oda, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 894 days.

(21) Appl. No.: 17/617,868

(22) PCT Filed: Jun. 29, 2020

(86) PCT No.: PCT/JP2020/025440
§ 371 (c)(1),
(2) Date: Dec. 9, 2021

(87) PCT Pub. No.: WO2021/002307
PCT Pub. Date: Jan. 7, 2021

(65) Prior Publication Data
US 2022/0306787 A1  Sep. 29, 2022

(30) Foreign Application Priority Data
Jul. 3, 2019 (JP) ................. 2019-124272

(51) Int. Cl.
*C08F 222/38* (2006.01)
*C08F 122/38* (2006.01)
*C08F 220/56* (2006.01)
*C08F 220/58* (2006.01)
*C08F 290/06* (2006.01)

(52) U.S. Cl.
CPC ...... *C08F 222/385* (2013.01); *C08F 122/385* (2013.01); *C08F 220/56* (2013.01); *C08F 220/58* (2013.01); *C08F 290/062* (2013.01)

(58) Field of Classification Search
CPC ............. C08F 222/385; C08F 122/385; C08F 220/56; C08F 220/58; C08F 290/062; C08F 222/38; C08F 122/38; C08F 2/38; C07C 271/20; C07C 2601/14; C07C 271/24; C07C 271/28; C07C 271/48; C07C 271/16; C07C 241/04; C07C 233/02; C07C 235/28
See application file for complete search history.

(56) References Cited

U.S. PATENT DOCUMENTS

| | | | |
|---|---|---|---|
| 10,400,133 B2 | 9/2019 | Fukagawa | |
| 2002/0143138 A1 | 10/2002 | Moszner et al. | |
| 2009/0264551 A1 | 10/2009 | Nakasugi et al. | |
| 2020/0179237 A1* | 6/2020 | Ishihara | C08K 3/36 |

FOREIGN PATENT DOCUMENTS

| | | | | |
|---|---|---|---|---|
| CA | 2368064 A1 | 7/2002 | | |
| CN | 105073790 A | 11/2015 | | |
| EP | 1222910 A2 | 7/2002 | | |
| EP | 3904100 A1 | 11/2021 | | |
| JP | S44-015766 B | 7/1969 | | |
| JP | 2007-256442 A | 10/2007 | | |
| JP | 2009244778 A | * 10/2009 | | C03F 7/00 |
| JP | 2009-273875 A | 11/2009 | | |
| JP | 4743848 B2 | 8/2011 | | |
| TW | 201922889 A | 6/2019 | | |
| WO | 2007/139157 A1 | 12/2007 | | |
| WO | 2017/010456 A1 | 1/2017 | | |

OTHER PUBLICATIONS

Machine English translation of JP2009244778A (Year: 2009).*
Jun. 26, 2023 Extended European Search Report Issued in European Patent Application No. 20834653.6.
Moszner et al., "New Diluents for Dental Composites," Macromolecular Materials and Engineering, 2016, vol. 301, pp. 750-759.
Sep. 15, 2020 International Search Report issued in International Patent Application No. PCT/JP2020/025440.

* cited by examiner

*Primary Examiner* — Jessica M Roswell
(74) *Attorney, Agent, or Firm* — Oliff PLC

(57) ABSTRACT

A polymerizable composition includes an amide compound represented by Formula (1) and a polymerization initiator.

13 Claims, No Drawings

AMIDE COMPOUND, POLYMERIZABLE COMPOSITION, CURED MATERIAL, AND METHOD OF MANUFACTURING CURED MATERIAL

TECHNICAL FIELD

The present invention relates to an amide compound having an amide bond (—NH—C(=O)—), a polymerizable composition using the amide compound, a cured material manufactured using the polymerizable composition, and a method of manufacturing the cured material.

BACKGROUND ART

An amide compound is polymerizable (curable) with use of a polymerization initiator, and is used as a material for coating in various fields including, without limitation, paints, inks, and adhesives. Accordingly, a polymerizable composition including the amide compound and the polymerization initiator has been used, and a cured material which is a polymerized (cured) product of the polymerizable composition has also been used.

In order to improve a property such as a coating property, various considerations have been given regarding the amide compound. Specifically, in order to obtain a UV ink superior in a property such as printability, a water-soluble acrylamide such as N-alkoxyalkylacrylamide is used (for example, see PTL 1). Further, in order to manufacture ω-aminoalkanenitrile, lactam and ammonia are reacted with each other with use of titanium oxide and aluminum fluoride as catalysts (for example, see PTL 2).

CITATION LIST

Patent Literature

PTL 1: Japanese Patent No. 4743848
PTL 2: Japanese Patent No. 0561870

SUMMARY OF THE INVENTION

Although considerations have been actively given regarding an amide compound, the amid compound does not have a sufficient physical property yet, which still leaves room for improvement.

Accordingly, it is desirable to provide an amide compound, a polymerizable composition, a cured material, and a method of manufacturing a cured material that each makes it possible to achieve a superior physical property.

An amide compound according to one embodiment of the present invention is represented by Formula (5).

[Chem. 1]

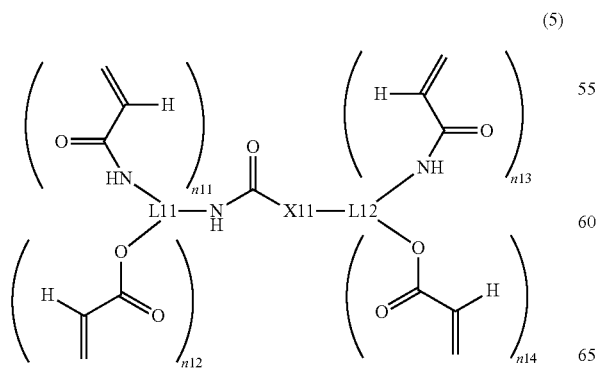

(5)

where:
L11 is one of an (n11+n12+1)-valent unsubstituted hydrocarbon group, an (n11+n12+1)-valent unsubstituted heterocyclic group, an (n11+n12+1)-valent substituted hydrocarbon group, and an (n11+n12+1)-valent substituted heterocyclic group;
L12 is one of an (n13+n14+1)-valent unsubstituted hydrocarbon group, an (n13+n14+1)-valent unsubstituted heterocyclic group, an (n13+n14+1)-valent substituted hydrocarbon group, and an (n13+n14+1)-valent substituted heterocyclic group;
X11 is one of —O—, —S—, and a single bond;
each of n11, n12, n13, and n14 is an integer of greater than or equal to 0 and less than or equal to 5;
the (n11+n12+1)-valent substituted hydrocarbon group and the (n13+n14+1)-valent substituted hydrocarbon group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or a divalent linking group represented by each of Formulae (6-1) to (6-8) into an (n11+n12+1)-valent unsubstituted hydrocarbon group and an (n13+n14+1)-valent unsubstituted hydrocarbon group, respectively;
the (n11+n12+1)-valent substituted heterocyclic group and the (n13+n14+1)-valent substituted heterocyclic group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (6-1) to (6-8) into an (n11+n12+1)-valent unsubstituted heterocyclic group and an (n13+n14+1)-valent unsubstituted heterocyclic group, respectively; and
n11, n12, n13, and n14 satisfy (n11+n12+n13+n14)≥2.

[Chem. 2]

 (6-1)

 (6-2)

 (6-3)

 (6-4)

 (6-5)

 (6-6)

 (6-7)

 (6-8)

where each of R11, R12, and R13 is one of a monovalent unsubstituted hydrocarbon group, a monovalent unsubstituted heterocyclic group, a monovalent substituted hydrocarbon group, and a monovalent substituted heterocyclic group.

A polymerizable composition according to one embodiment of the present invention includes an amide compound represented by Formula (1) and a polymerization initiator.

[Chem. 3]

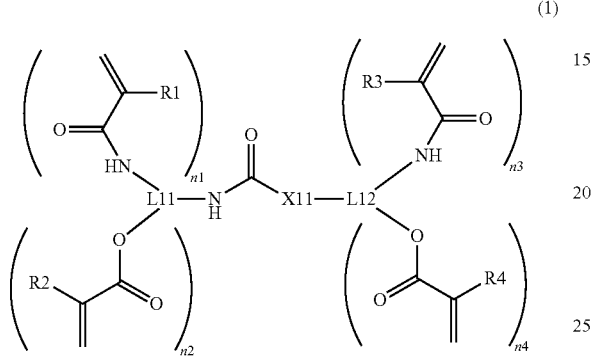

(1)

where:

L1 is one of an (n1+n2+1)-valent unsubstituted hydrocarbon group, an (n1+n2+1)-valent unsubstituted heterocyclic group, an (n1+n2+1)-valent substituted hydrocarbon group, and an (n1+n2+1)-valent substituted heterocyclic group;

L2 is one of an (n3+n4+1)-valent unsubstituted hydrocarbon group, an (n3+n4+1)-valent unsubstituted heterocyclic group, an (n3+n4+1)-valent substituted hydrocarbon group, and an (n3+n4+1)-valent substituted heterocyclic group;

X1 is one of —O—, —S—, and a single bond;

each of R1, R2, R3, and R4 is one of a hydrogen group and a monovalent unsubstituted hydrocarbon group;

each of n1, n2, n3, and n4 is an integer of greater than or equal to 0 and less than or equal to 5;

the (n1+n2+1)-valent substituted hydrocarbon group and the (n3+n4+1)-valent substituted hydrocarbon group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or a divalent linking group represented by each of Formulae (2-1) to (2-8) into an (n1+n2+1)-valent unsubstituted hydrocarbon group and an (n3+n4+1)-valent unsubstituted hydrocarbon group, respectively;

the (n1+n2+1)-valent substituted heterocyclic group and the (n3+n4+1)-valent substituted heterocyclic group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (2-1) to (2-8) into an (n1+n2+1)-valent unsubstituted heterocyclic group and an (n3+n4+1)-valent unsubstituted heterocyclic group, respectively; and n1, n2, n3, and n4 satisfy (n1+n2+n3+n4)≥2.

[Chem. 4]

(2-1)

(2-2)

(2-3)

(2-4)

(2-5)

(2-6)

(2-7)

(2-8)

where each of R5, R6, and R7 is one of a monovalent unsubstituted hydrocarbon group, a monovalent unsubstituted heterocyclic group, a monovalent substituted hydrocarbon group, and a monovalent substituted heterocyclic group.

A cured material according to one embodiment of the present invention is a cured product of a polymerizable composition, and the polymerizable composition has a configuration similar to that of the polymerizable composition according to the embodiment of the present invention described above.

A method of manufacturing a cured material according to one embodiment of the present invention includes irradiating a polymerizable composition with an active energy ray, and the polymerizable composition has a configuration similar to that of the polymerizable composition according to the embodiment of the present invention described above.

The definition of each of the "unsubstituted hydrocarbon group", the "substituted hydrocarbon group", the "unsubstituted heterocyclic group", and the "substituted heterocyclic group" is as described below. Note that a group belonging to each of the "unsubstituted heterocyclic group" and the "substituted heterocyclic group" is excluded from the "substituted hydrocarbon group".

The "unsubstituted hydrocarbon group" is a hydrocarbon group into which the above-described substituent such as a halogen group or the divalent linking group is not introduced, i.e., a group including only carbon (C) and hydrogen (H). Note that the unsubstituted hydrocarbon group may be cyclic or may include one or more rings. In contrast, the "substituted hydrocarbon group" is a hydrocarbon group into which the above-described substituent such as a halogen group or the divalent linking group is introduced, i.e., a group obtained by introducing a substituent into an unsubstituted hydrocarbon group. Note that in a case where the unsubstituted hydrocarbon group includes one or more rings, the divalent linking group is introduced into a portion other than the ring of the unsubstituted hydrocarbon group. Details of each of the unsubstituted hydrocarbon group and the substituted hydrocarbon group will be described later.

Similarly, the "unsubstituted heterocyclic group" is a heterocyclic group into which the above-described substituent such as a halogen group or the divalent linking group is not introduced, i.e., a group in which a ring includes two or more mutually-different elements. In contrast, the "substituted heterocyclic group" is a heterocyclic group into which the above-described substituent such as a halogen group or the divalent linking group is introduced, i.e., a group obtained by introducing a substituent into an unsubstituted heterocyclic group. Note that the divalent linking group is introduced into a portion other than the ring of the unsubstituted heterocyclic group. Details of each of the unsubstituted heterocyclic group and the substituted heterocyclic group will be described later.

According to the amide compound of the embodiment of the present invention, the amide compound has the configuration represented by Formula (5). It is therefore possible to achieve a superior physical property.

Moreover, according to the polymerizable composition or the cured material of the embodiment of the present invention, the amide compound included in the polymerizable composition has the configuration represented by Formula (1). It is therefore possible to achieve a superior physical property.

Moreover, according to the method of manufacturing a cured material of the embodiment of the present invention, the above-described polymerizable composition is irradiated with the active energy ray. It is therefore possible to obtain a cured material having a superior physical property.

MODES FOR CARRYING OUT THE INVENTION

Some embodiments of the present invention are described below in detail. The description is given in the following order. Note that details of the present invention are not limited to examples described below and are appropriately modifiable.
1. Amide Compound
2. Polymerizable Composition
3. Cured Material and Method of Manufacturing Cured Material
4. Uses
<1. Amide Compound>

A description is given first of an amid compound according to an embodiment of the present invention.
[Configuration]

The amide compound is a compound represented by Formula (5). In other words, the amide compound is a polyfunctional compound having an amide bond (—NH—C(=O)—), and is polymerizable (curable) with use of a polymerization initiator, as will be described later.

[Chem. 5]

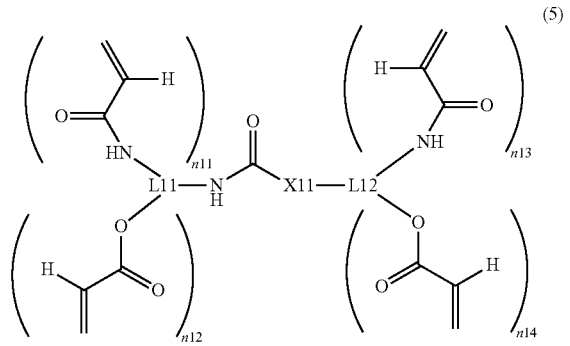

(5)

where:
L11 is one of an (n11+n12+1)-valent unsubstituted hydrocarbon group, an (n11+n12+1)-valent unsubstituted heterocyclic group, an (n11+n12+1)-valent substituted hydrocarbon group, and an (n11+n12+1)-valent substituted heterocyclic group;
L12 is one of an (n13+n14+1)-valent unsubstituted hydrocarbon group, an (n13+n14+1)-valent unsubstituted heterocyclic group, an (n13+n14+1)-valent substituted hydrocarbon group, and an (n13+n14+1)-valent substituted heterocyclic group; and
X11 is one of —O—, —S—, and a single bond;
the (n11+n12+1)-valent substituted hydrocarbon group and the (n13+n14+1)-valent substituted hydrocarbon group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or a divalent linking group represented by each of Formulae (6-1) to (6-8) into an (n11+n12+1)-valent unsubstituted hydrocarbon group and an (n13+n14+1)-valent unsubstituted hydrocarbon group, respectively;
the (n11+n12+1)-valent substituted heterocyclic group and the (n13+n14+1)-valent substituted heterocyclic group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (6-1) to (6-8) into an (n11+n12+1)-valent unsubstituted heterocyclic group and an (n13+n14+1)-valent unsubstituted heterocyclic group, respectively; and
n11, n12, n13, and n14 satisfy (n11+n12+n13+n14)≥2.

[Chem. 2]

 (6-1)

 (6-2)

 (6-3)

 (6-4)

 (6-5)

 (6-6)

 (6-7)

 (6-8)

where each of R11, R12, and R13 is one of a monovalent unsubstituted hydrocarbon group, a monovalent unsubstituted heterocyclic group, a monovalent substituted hydrocarbon group, and a monovalent substituted heterocyclic group.

More specifically, in the amide compound, n11-number of nitrogen-based bonded groups (—NH—C(=O)—C(=CH$_2$)—H) and n12-number of oxygen-based bonded groups (—O—C(=O)—C(=CH$_2$)—H) are bonded to one end (L11) of a body (>L11-NH—C(=O)—X11-L12<) having an amide bond. In addition, in the amide compound, n13-number of nitrogen-based bonded groups (—NH—C(=O)—C(=CH$_2$)—H) and n14-number of oxygen-based bonded groups (—O—C(=O)—C(=CH$_2$)—H) are bonded to the other end (L12) of the above-described body. Details of the configuration of the amide compound are as described below.

(L11 and L12)

L11 is not particularly limited as long as L11 is one of an (n11+n12+1)-valent unsubstituted hydrocarbon group, an (n11+n12+1)-valent unsubstituted heterocyclic group, an (n11+n12+1)-valent substituted hydrocarbon group, and an (n11+n12+1)-valent substituted heterocyclic group.

Here, as described above, the "unsubstituted hydrocarbon group" is a hydrocarbon group into which a substituent such as a halogen group or the divalent linking group is not introduced, i.e., a group including only carbon and hydrogen. Note that the unsubstituted hydrocarbon group may be cyclic or may include one or more rings. In contrast, the "substituted hydrocarbon group" is a hydrocarbon group into which a substituent such as a halogen group or the divalent linking group is introduced, i.e., a group obtained by introducing a substituent into an unsubstituted hydrocarbon group. Note that in a case where the unsubstituted hydrocarbon group includes one or more rings, the divalent linking group is introduced into a portion other than the ring of the unsubstituted hydrocarbon group. Accordingly, a group belonging to each of the "unsubstituted heterocyclic group" and the "substituted heterocyclic group" is excluded from the "substituted hydrocarbon group" described here.

Similarly, as described above, the "unsubstituted heterocyclic group" is a heterocyclic group into which a substituent such as a halogen group or the divalent linking group is not introduced, i.e., a group in which a ring includes two or more mutually-different elements. In contrast, the "substituted heterocyclic group" is a heterocyclic group into which a halogen group and the divalent linking group are introduced, i.e., a group obtained by introducing substituents into the unsubstituted heterocyclic group. Note that the divalent linking group is introduced into a portion other than the ring of the unsubstituted heterocyclic group.

In detail, the (n11+n12+1)-valent unsubstituted hydrocarbon group is an (n11+n12+1)-valent group including carbon and hydrogen, and may have a straight-chain structure, a branched structure having one or more side chains, a cyclic structure, or a structure in which two or more thereof are bonded to each other. Specifically, examples of the (n11+n12+1)-valent hydrocarbon group include a group obtained by removing (n11+n12+1)-number of hydrogen groups from each of an alkane, an alkene, an alkyne, an aliphatic ring (cycloalkane), and an aromatic ring. Examples of the alkane include methane, ethane, and propane. Examples of the alkene include ethylene and propylene. Examples of the alkyne include acetylene and propyne. Examples of the cycloalkane include cyclopropane, cyclobutane, and cyclohexane. Examples of the aromatic ring include benzene and naphthalene.

Carbon number of the (n11+n12+1)-valent unsubstituted hydrocarbon group is not particularly limited, but in particular, is preferably from 1 to 30 both inclusive, more preferably from 1 to 12 both inclusive, still more preferably from 1 to 8 both inclusive, and particularly preferably from 1 to 3 both inclusive. A reason for this is that such a not-too-large carbon number allows for improvement in properties including, without limitation, solubility and compatibility of the amide compound. Another reason is that such a carbon number allows for improvement in hardness of a film in a case where the film (a cured material) is formed using a polymerization (curing) reaction of the amide compound.

The (n11+n12+1)-valent unsubstituted heterocyclic group is an (n11+n12+1)-valent cyclic group having a ring including two or more mutually-different elements, and may have one or more side chains. Note that at least a portion of the two or more side chains may be bonded to each other to form a ring. The above-described two or more elements are carbon and one or more of other elements that are elements other than carbon. The other elements are not particularly limited, and examples thereof include nitrogen (N), oxygen (O), and sulfur (S). Specifically, examples of the (n11+n12+1)-valent unsubstituted heterocyclic group include a group obtained by removing (n11+n12+1)-number of hydrogen groups from each of thiazole, imidazole, oxazole, pyridine, pyrazinine, pyrimidinine, pyridazinine, thiophene, furan, bithiophene, and terthiophene.

Carbon number of the (n11+n12+1)-valent unsubstituted heterocyclic group is not particularly limited, but in particular, is preferably from 2 to 30 both inclusive, more preferably from 2 to 12 both inclusive, and still more preferably from 2 to 8 both inclusive. A reason for this is that such a not-too-large carbon number allows for improvement in properties including, without limitation, the solubility and the compatibility of the amide compound. Another reason is that such a carbon number allows for improvement in the hardness of the film (the cured material).

The (n11+n12+1)-valent substituted hydrocarbon group is a group obtained by introducing one or more substituents into the above-described (n11+n12+1)-valent unsubstituted hydrocarbon group. The one or more substituents may include a monovalent group, a divalent group, or both.

Specifically, examples of the monovalent group include a halogen group, a nitro group, a cyano group, a hydroxyl group, an amino group, a carboxyl group, a methacryloyl group, an acryloyl group, an epoxy group, a vinyl ether group, a mercapto group, an isocyanate group, and a monovalent unsubstituted heterocyclic group. The halogen group is not particularly limited in kind, and for example, one or more of a fluorine group, a chlorine group, a bromine group, an iodine group, and the like may be used. Details of the monovalent unsubstituted heterocyclic group will be described later. This monovalent group has one bond, and is therefore substituted with any hydrogen group in the (n11+n12+1)-valent unsubstituted hydrocarbon group.

Examples of the divalent group include respective divalent linking groups represented by Formulae (6-1) to (6-8). Details of each of the monovalent unsubstituted hydrocarbon group, the monovalent unsubstituted heterocyclic group, the monovalent substituted hydrocarbon group, and the monovalent substituted heterocyclic group will be described later. This divalent substituent has two bonds, and is therefore to be introduced at any position in the middle of the (n11+n12+1)-valent unsubstituted hydrocarbon group, i.e., between two carbon atoms forming a carbon skeleton of the (n11+n12+1)-valent unsubstituted hydrocarbon group. Thus, one bond of the divalent group is bonded to one of the two carbon atoms, and the other bond of the divalent group is bonded to the other of the two carbon atoms. Note that as described above, in a case where the (n11+n12+1)-valent unsubstituted hydrocarbon group includes one or more rings, the divalent group is to be introduced not into the one or more rings but into a portion other than the one or more rings, i.e., into a chain portion or a side chain portion.

Details of the carbon number of the (n11+n12+1)-valent substituted hydrocarbon group are, for example, similar to those of the carbon number of the (n11+n12+1)-valent unsubstituted hydrocarbon group. That is, the carbon number of the (n11+n12+1)-valent substituted hydrocarbon group is not particularly limited, but in particular, is preferably from 1 to 30 both inclusive, more preferably from 1 to 12 both inclusive, still more preferably from 1 to 8 both inclusive, and particularly preferably from 1 to 3 both inclusive.

The (n11+n12+1)-valent substituted heterocyclic group is a group obtained by introducing one or more substituents into the above-described (n11+n12+1)-valent unsubstituted heterocyclic group. Details of the substituents are as described above except that the examples of the monovalent group include the monovalent unsubstituted hydrocarbon group instead of the monovalent unsubstituted heterocyclic group. Details of the monovalent unsubstituted hydrocarbon group will be described later. Note that as described above, a substituent which is the divalent linking group is to be introduced into a portion other than a ring in the (n11+n12+1)-valent unsubstituted heterocyclic group, i.e., into a chain portion or a side chain portion.

Details of the carbon number of the (n11+n12+1)-valent substituted heterocyclic group are, for example, similar to those of the carbon number of the (n11+n12+1)-valent unsubstituted heterocyclic group. That is, the carbon number of the (n11+n12+1)-valent substituted heterocyclic group is not particularly limited, but in particular, is preferably from 2 to 30 both inclusive, more preferably from 2 to 12 both inclusive, and still more preferably from 2 to 8 both inclusive.

Details of L12 are similar to those of L11 described above, except that the valence is (n13+n14+1) instead of (n11+n12+1). Note that the kind of L12 may be the same as or different from that of L11.

That is, the carbon number of the (n13+n14+1)-valent unsubstituted hydrocarbon group is not particularly limited, but in particular, is preferably from 1 to 30 both inclusive, more preferably from 1 to 12 both inclusive, still more preferably from 1 to 8 both inclusive, and particularly preferably from 1 to 3 both inclusive. The carbon number of the (n13+n14+1)-valent unsubstituted heterocyclic group is not particularly limited, but in particular, is preferably from 2 to 30 both inclusive, more preferably from 2 to 12 both inclusive, and still more preferably from 2 to 8 both inclusive.

X11 is not particularly limited as long as X11 is one of an ether bond (—O—), a thio bond (—S—), and a single bond. In a case where X11 is the single bond, for example, a carbon atom in a carbonyl group (>C=O) and a carbon atom in L12 are bonded to each other.

Among the above, it is preferable that X11 be —O—. A reason for this is that, when a film (a cured material) is formed using a polymerization (curing) reaction of the amide compound, adherence of the film to a later-described base improves and the hardness of the film also improves. In this case, superior flexibility of the film is also achievable.
(R11, R12, and R13)

R11 is not particularly limited as long as R11 is one of a monovalent unsubstituted hydrocarbon group, a monovalent unsubstituted heterocyclic group, a monovalent substituted hydrocarbon group, and a monovalent substituted heterocyclic group.

Details of the monovalent unsubstituted hydrocarbon group are similar to those of the (n11+n12+1)-valent unsubstituted hydrocarbon group, except that the valence is one instead of (n11+n12+1). Specifically, examples of the monovalent unsubstituted hydrocarbon group include a methyl group, an ethyl group, a propyl group, an ethylene group, a propylene group, an ethynyl group, a propynyl group, a cyclopropyl group, a cyclobutyl group, a cyclohexyl group, a phenyl group, and a naphthyl group. Details of the monovalent unsubstituted heterocyclic group are similar to those of the (n11+n12+1)-valent unsubstituted heterocyclic group, except that the valence is one instead of (n11+n12+1). Specifically, examples of the monovalent unsubstituted heterocyclic group include a thiazolyl group, an imidazolyl group, an oxazolyl group, a pyridyl group, a pyrazinyl group, a pyrimidinyl group, a pyridazinyl group, a thiophenyl group, a furanyl group, a bithiophenyl group, and a terthiophenyl group.

Details of the monovalent substituted hydrocarbon group are similar to those of the (n11+n12+1)-valent substituted hydrocarbon group, except that the valence is one instead of (n11+n12+1). Details of the monovalent substituted heterocyclic group are similar to those of the (n11+n12+1)-valent unsubstituted heterocyclic group, except that the valence is one instead of (n11+n12+1).
(n11, n12, n13, and n14)

The value of each of n11 to n14 is not particularly limited as long as the value is an integer from 0 to 5 both inclusive. Note that the value of n11 may be the same as or different from the value of n12. The description here is similarly applicable to a relationship between the value of n11 and the value of n13 as well as a relationship between the value of n11 and the value of n14.

The value of n11 is a value that determines the number of the nitrogen-based bonded groups (—NH—C(=O)—C(=CH$_2$)—H) to be bonded to L11, as described above. The value of n12 is a value that determines the number of the oxygen-based bonded groups (—O—C(=O)—C(=CH$_2$)—H) to be bonded to L11, as described above. The value of n13 is a value that determines the number of the nitrogen-based bonded groups (—NH—C(=O)—C(=CH$_2$)—H) to be bonded to L12, as described above. The value of n14 is a value that determines the number of the oxygen-based bonded groups (—O—C(=O)—C(=CH$_2$)—H) to be bonded to L12, as described above.

Note that n11 to n14 satisfy (n11+n12+n13+n14)≥2. A reason for this is that this allows for improvement in properties including, without limitation, the solubility and the compatibility of the amide compound. Accordingly, a compound in which (n11+n12+n13+n14)=0 or 1 holds is excluded from the amide compound described here. A reason for this is that such a compound is insufficient in properties including, without limitation, the solubility and the compatibility of the amide compound.

In particular, in the amide compound described here, the above-described nitrogen-based bonded group has a hydrogen group at its terminal and the above-described oxygen-based bonded group has a hydrogen group at its terminal. Therefore, the solubility of the amide compound in an aqueous solvent improves. This improves transparency of the film (the cured material) formed using the polymerization (curing) reaction of the amide compound and also improves the hardness of the film.

If the condition of (n11+n12+n13+n14)≥2 is satisfied, the number of the nitrogen-based bonded groups and the number of the oxygen-based bonded groups described above may be freely set. In other words, the amide compound may include only the nitrogen-based bonded group, only the oxygen-based bonded group, or both.

In particular, it is preferable that n11 to n14 satisfy (n11+n12+n13+n14)=2. A reason for this is that this allows for sufficient improvement in properties including, without limitation, the solubility and the compatibility of the amide compound, and therefore allows for improvement in the transparency of the film (the cured material) described above.

In this case, it is further preferable that n11 to n14 satisfy (n11+n13)≥1 and (n12+n14)≥1. In other words, it is preferable that the amide compound include one or more nitrogen-based bonded groups and one or more oxygen-based bonds. A reason for this is that this secures properties including, without limitation, the solubility and the compatibility of the amide compound.

Specific Examples

Specific examples of the amide compound include respective compounds represented by Formulae (1-1), (1-6), (1-8), (1-10), (1-11), and (1-13) to (1-16) which will be described later. Note that the amide compound may be any compound other than those exemplified here as long as the compound satisfies the condition represented by Formula (5).

[Manufacturing Method]

A method of manufacturing the amide compound is not particularly limited. Therefore, the amide compound is synthesizable by an existing synthesis method. Details of a method of synthesizing the amide compound will be described later.

[Action and Effects]

According to this amide compound, the amide compound has the configuration represented by Formula (5). In this case, firstly, superior properties including, without limitation, superior solubility and superior compatibility are achieved, which results in improvement in storage stability (transparency) and coatability of a coating agent including the amide compound. Secondly, a dense film (cured material) is formed using the polymerization (curing) reaction of the amide compound, which results in improvement in adherence of the film to the later-described base. Thirdly, a film having superior physical strength is formed, which results in improvement in hardness of the film. Accordingly, it is possible to achieve superior physical properties.

In particular, X11 in Formula (5) may be —O—. This improves adherence of the film to the base when the film (the cured material) is formed using the polymerization (curing) reaction of the amide compound, and also improves the hardness of the film. Accordingly, it is possible to achieve higher effects.

Moreover, n11 to n14 in Formula (5) may satisfy (n11+n12+n13+n14)=2. This sufficiently improves properties including, without limitation, the solubility and the compatibility of the amide compound. Accordingly, it is possible to achieve higher effects. In this case, n11 to n14 may further satisfy (n11+n13)≥1 and (n12+n14)≥1. This secures properties including, without limitation, the solubility and the compatibility of the amide compound. Accordingly, it is possible to achieve higher effects.

Moreover, each of the (n11+n12+1)-valent unsubstituted hydrocarbon group and the (n13+n14+1)-valent unsubstituted hydrocarbon group may have carbon number from 1 to 30 both inclusive, and each of the (n11+n12+1)-valent unsubstituted heterocyclic group and the (n13+n14+1)-valent unsubstituted heterocyclic group has carbon number from 2 to 30 both inclusive. This improves properties including, without limitation, the solubility and the compatibility of the amide compound, and also improves the hardness of the film (the cured material). Accordingly, it is possible to achieve higher effects.

<2. Polymerizable Composition>

A description is given next of a polymerizable composition according to an embodiment of the present invention using the above-described amide compound.

[Configuration]

The polymerizable composition includes the amide compound and a polymerization initiator, and the amide compound is polymerizable (curable) with use of the polymerization initiator, as described above.

For example, a case where the polymerizable composition includes a solvent for preparation in addition to the amide compound and the polymerization initiator is described below. The solvent for preparation is used to prepare a liquid polymerizable composition, and each of the amide compound and the polymerization initiator is dispersed or dissolved in the solvent. Details of the solvent for preparation will be described later.

The liquid polymerizable composition described here is used, for example, in a coating process in various fields (uses). For this reason, the liquid polymerizable composition including the solvent for preparation is referred to as a "coating agent" below. The coating agent is applied onto surfaces of various bases in various fields described above, and is used to form a film on the surface of the base by a coating method. As will be described later, the film includes the cured material that is a polymerized (cured) product of the polymerizable composition. Details of each of the use of the coating agent and the base to apply the coating agent will be described later.

(Amide Compound)

The amide compound included in the polymerizable composition described here includes the amide compound represented by Formula (5), and more specifically, includes one or more of compounds represented by Formula (1).

[Chem. 7]

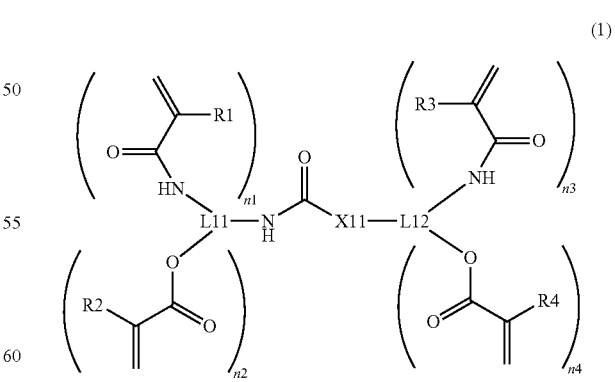

(1)

where:
L1 is one of an (n1+n2+1)-valent unsubstituted hydrocarbon group, an (n1+n2+1)-valent unsubstituted heterocyclic group, an (n1+n2+1)-valent substituted hydrocarbon group, and an (n1+n2+1)-valent substituted heterocyclic group;

L2 is one of an (n3+n4+1)-valent unsubstituted hydrocarbon group, an (n3+n4+1)-valent unsubstituted heterocyclic group, an (n3+n4+1)-valent substituted hydrocarbon group, and an (n3+n4+1)-valent substituted heterocyclic group;

X1 is one of —O—, —S—, and a single bond;

each of R1, R2, R3, and R4 is one of a hydrogen group and a monovalent unsubstituted hydrocarbon group;

each of n1, n2, n3, and n4 is an integer of greater than or equal to 0 and less than or equal to 5;

the (n1+n2+1)-valent substituted hydrocarbon group and the (n3+n4+1)-valent substituted hydrocarbon group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or a divalent linking group represented by each of Formulae (2-1) to (2-8) into an (n1+n2+1)-valent unsubstituted hydrocarbon group and an (n3+n4+1)-valent unsubstituted hydrocarbon group, respectively;

the (n1+n2+1)-valent substituted heterocyclic group and the (n3+n4+1)-valent substituted heterocyclic group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (2-1) to (2-8) into an (n1+n2+1)-valent unsubstituted heterocyclic group and an (n3+n4+1)-valent unsubstituted heterocyclic group, respectively; and n1, n2, n3, and n4 satisfy (n1+n2+n3+n4)≥2.

[Chem. 8]

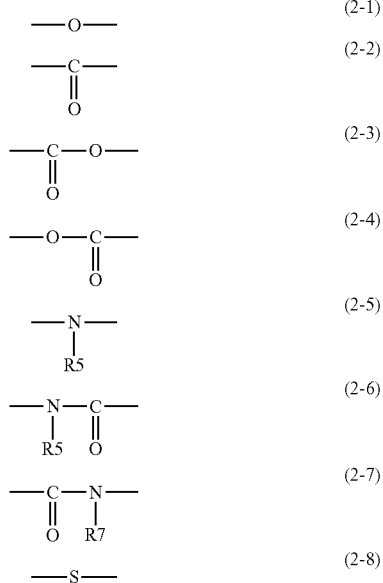

where each of R5, R6, and R7 is one of a monovalent unsubstituted hydrocarbon group, a monovalent unsubstituted heterocyclic group, a monovalent substituted hydrocarbon group, and a monovalent substituted heterocyclic group.

As is apparent from Formula (1), the amide compound included in the polymerizable composition has a configuration similar to that of the amide compound represented by Formula (5), except that respective terminals (R1 and R3) of the nitrogen-based bonded groups are not limited to hydrogen groups, and respective terminals (R2 and R4) of the oxygen-based bonded groups are not limited to hydrogen groups. Details of the configuration of the amide compound represented by Formula (1) are as described below.

Details of L1 and L2 are similar to those of L11 and L12, respectively.

That is, details of the (n1+n2+1)-valent unsubstituted hydrocarbon group, the (n1+n2+1)-valent unsubstituted heterocyclic group, the (n1+n2+1)-valent substituted hydrocarbon group, and the (n1+n2+1)-valent substituted heterocyclic group are similar to those of the (n11+n12+1)-valent unsubstituted hydrocarbon group, the (n11+n12+1)-valent unsubstituted heterocyclic group, the (n11+n12+1)-valent substituted hydrocarbon group, and the (n11+n12+1)-valent substituted heterocyclic group, respectively, except that the valence is (n1+n2+1) instead of (n11+n12+1).

In addition, details of the (n3+n4+1)-valent unsubstituted hydrocarbon group, the (n3+n4+1)-valent unsubstituted heterocyclic group, the (n3+n4+1)-valent substituted hydrocarbon group, and the (n3+n4+1)-valent substituted heterocyclic group are similar to those of the (n13+n14+1)-valent unsubstituted hydrocarbon group, the (n13+n14+1)-valent unsubstituted heterocyclic group, the (n13+n14+1)-valent substituted hydrocarbon group, and the (n13+n14+1)-valent substituted heterocyclic group, respectively, except that the valence is (n3+n4+1) instead of (n13+n14+1).

Details of X1 are similar to those of X11. That is, it is preferable that X1 be —O— in particular.

R1 is not particularly limited as long as R1 is one of a hydrogen group and a monovalent unsubstituted hydrocarbon group. Details of the monovalent unsubstituted hydrocarbon group are as described above. Carbon number of the monovalent unsubstituted hydrocarbon group is not particularly limited, but in particular, is preferably from 1 to 3 both inclusive. A reason for this is that such a not-too-large carbon number allows for improvement in properties including, without limitation, the solubility and the compatibility of the amide compound. In particular, the monovalent unsubstituted hydrocarbon group is preferably a methyl group.

Details of each of R2 to R4 are similar to those of R1 described above. Note that the kind of R1 may be the same as or different from the kind of R2. The description here is similarly applicable to a relationship between the kind of R1 and the kind of R3 as well as a relationship between the kind of R1 and the kind of R4.

In particular, each of R1 to R4 is preferably a hydrogen group. A reason for this is that, as described above, this improves the solubility of the amide compound in an aqueous solvent, therefore making it possible to use an aqueous solvent as a solvent for preparing the coating agent. This expands the degree of freedom in choosing the kind of solvent. In addition, this improves the storage stability and the coatability of the coating agent, and also improves the adherence and the hardness of the film. Details of the aqueous solvent will be described later.

Details of n1 to n4 are similar to those of n11 to n14. That is, it is preferable that n1 to n4 satisfy (n1+n2+n3+n4)=2. A reason for this is that this sufficiently improves properties including, without limitation, the solubility and the compatibility of the amide compound, therefore improving the storage stability and the coatability of the coating agent, and also improving the adherence and the hardness of the film.

In this case, it is preferable that n1 to n4 satisfy (n1+n3)≥1 and (n2+n4)≥1. A reason for this is that this ensures properties including, without limitation, the solubility and the compatibility of the amide compound, therefore further improving the storage stability and the coatability of the coating agent, and also further improving the adherence and the hardness of the film.

In addition, carbon number of each of the (n1+n2+1)-valent unsubstituted hydrocarbon group and the (n3+n4+1)-valent unsubstituted hydrocarbon group is preferably from 1 to 30 both inclusive, more preferably from 1 to 12 both inclusive, still more preferably from 1 to 8 both inclusive, and particularly preferable 1 or greater. Carbon number of each of the (n1+n2+1)-valent unsubstituted heterocyclic group and the (n3+n4+1)-valent unsubstituted heterocyclic group is preferably from 2 to 30 both inclusive, more preferably from 2 to 12 both inclusive, and still more preferably from 2 to 8 both inclusive. A reason for this is that such a carbon number allows for improvement in properties including, without limitation, the solubility and the compatibility of the amide compound, therefore improving the storage stability and the coatability of the coating agent, and also improving the adherence and the hardness of the film.

Specific examples of the amide compound included in the polymerizable composition include respective compounds represented by Formulae (1-1) to (1-23) described later. Note that the amide compound may be any other compound not exemplified here as long as the amide compound is a compound satisfying the condition represented by Formula (1).

[Chem. 9]

(1-1)
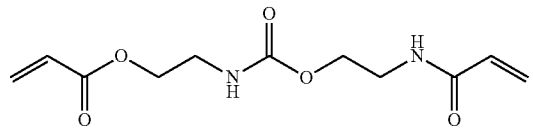

(1-2)
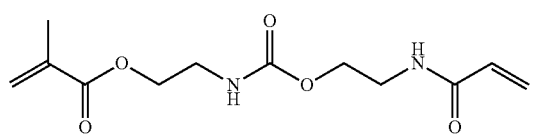

(1-3)
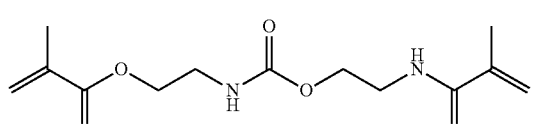

(1-4)
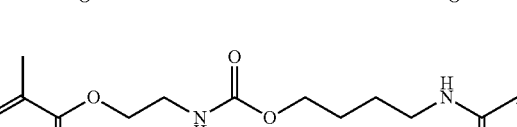

(1-5)
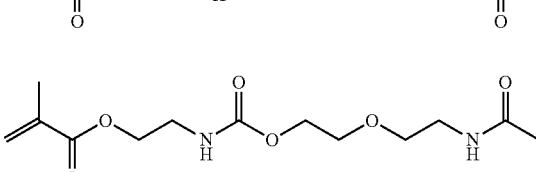

(1-6)
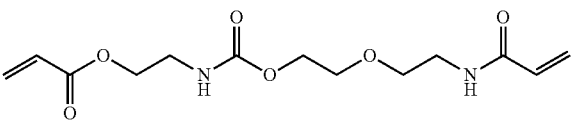

(1-7)
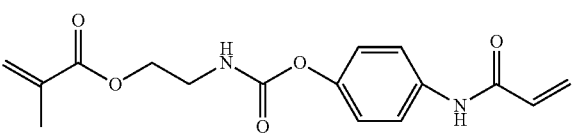

(1-8)
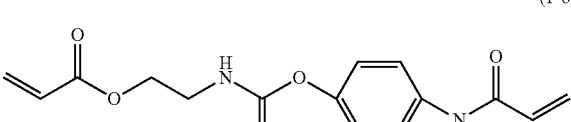

(1-9)
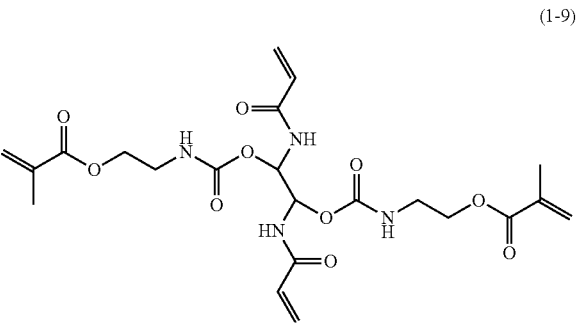

(1-10)
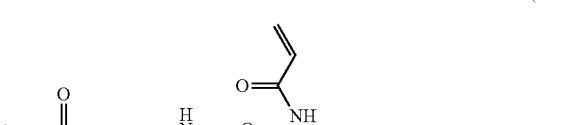

(1-11)
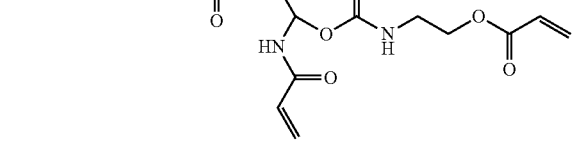

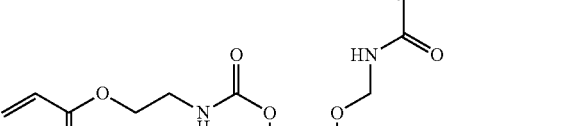

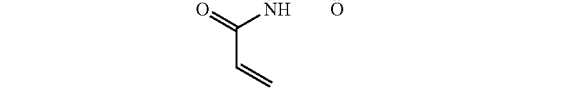

(1-12) 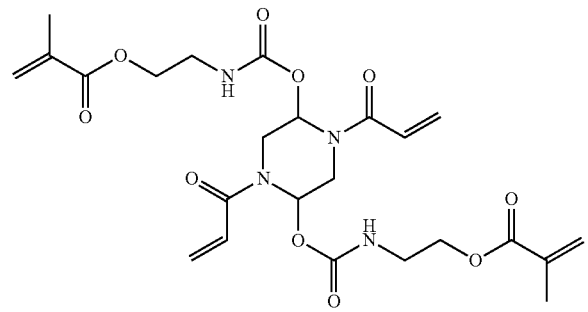
(1-13) 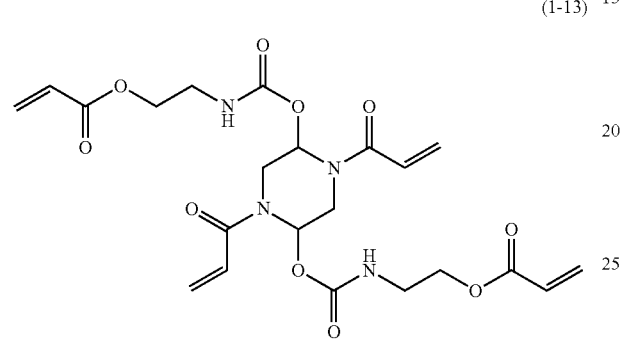
(1-14) 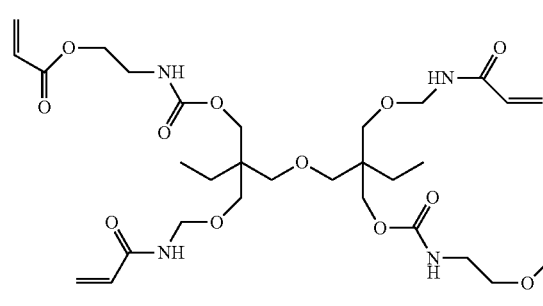
(1-15) 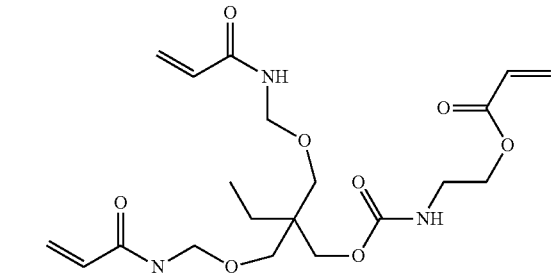
(1-16) 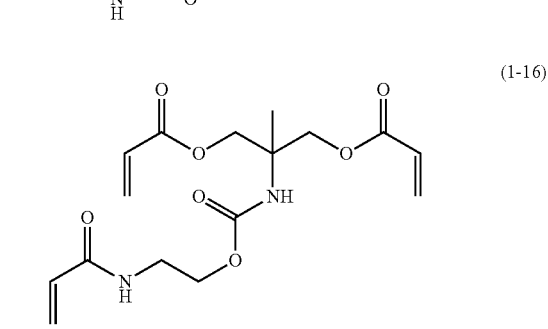
(1-17) 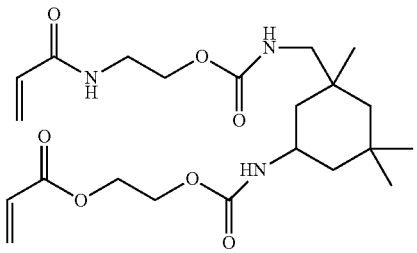
(1-18) 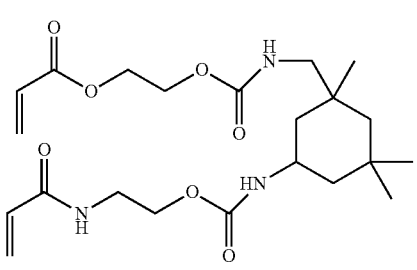
(1-19) 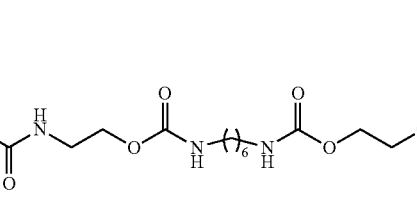
(1-20) 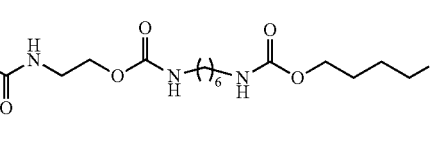
(1-21) 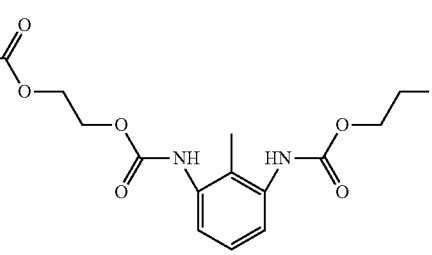
(1-22) 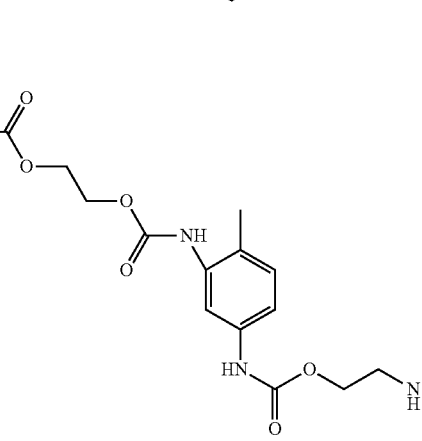

(1-23)

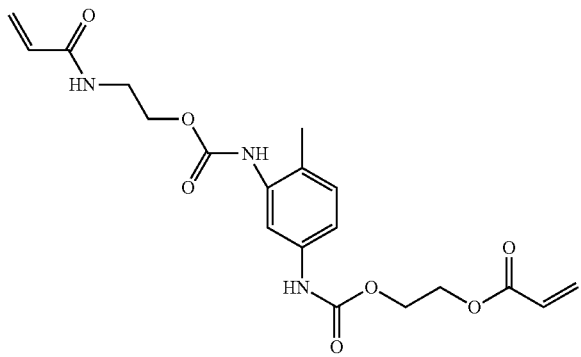

(Polymerization Initiator)

The polymerization initiator is a material that initiates the polymerization (curing) reaction of the amide compound. The polymerization initiator is not particularly limited in kind as long as the polymerization initiator includes one or more of materials that are able to generate radicals in response to light application. Therefore, a known material or known materials may be used as the polymerization initiator. Specifically, examples of the polymerization initiator include an acetophenone-based compound, a benzyl-based compound, a benzophenone-based compound, a thioxanthone-based compound, and an oxime ester-based compound.

Examples of the acetophenone-based compound include dietoxyacetophenone, 2-hydroxy-2-methyl-1-phenylpropane-1-one, 4'-isopropyl-2-hydroxy-2-methylpropiophenone, 2-hydroxymethyl-2-methylpropiophenone, 2,2-dimethoxy-1,2-diphenylethane-1-one, p-dimethylaminoacetophenone, p-tertiarybutyldichloroacetophenone, p-tertiarybutyltrichloroacetophenone, p-azidobenzal acetophenone, 1-hydroxycyclohexylphenylketone, 2-methyl-1-[4-(methylthio)phenyl]-2-morpholinopropanone-1,2-benzyl-2-dimethylamino-1-(4-morpholinophenyl)-butanone-1, benzoin, benzoin methyl ether, benzoin ethyl ether, benzoin isopropyl ether, benzoin-n-butylether, benzoin isobutyl ether, and 1-[4-(2-hydroxyethoxy)-phenyl]-2-hydroxy-2-methyl-1-propane-1-one.

Examples of the benzyl-based compound include benzyl.

Examples of the benzophenone-based compound include benzophenone, o-benzoyl methyl benzoate, Michler's ketone, 4,4'-bis(diethylamino)benzophenone, 4,4'-dichlorobenzophenone, and 4-benzoyl-4'-methyldiphenylsulfide.

Examples of the thioxanthone-based compound include thioxanthone, 2-methylthioxanthone, 2-ethylthioxanthone, 2-chlorothioxanthone, 2-isopropylthioxanthone, and 2,4-diethylthioxanthone.

The term "oxime ester-based compound" is a generic term for compounds each having an oxime ester group. Examples of the oxime ester-based compound include 1-phenyl[(propionyloxy)imino]propane-1-one. The oxime ester-based compound has favorable sensitivity, which makes the oxime ester-based compound superior among the polymerization initiators.

In addition, examples of commercially available polymerization initiator are as follows. Examples of the polymerization initiators available from ADEKA Corporation include ADEKA ARKLS N-1414, N-1717, and N-1919, and ADEKA ARKLS NCI-831 and NCI-930. Examples of the polymerization initiators available from BASF include IRGACURE 184, IRGACURE 369, IRGACURE 651, IRGACURE 907, IRGACURE OXE 01, IRGACURE OXE 02, and IRGACURE 784. Examples of the polymerization initiators available from Tronly include TR-PBG-304, TR-PBG-305, TR-PBG-309, and TR-PBG-314.

In particular, as will be described later, in a case where the solvent includes an aqueous solvent, the polymerization initiator preferably has water solubility, that is, the polymerization initiator is preferably a water-soluble polymerization initiator. A reason for this is that this allows for use of the aqueous solvent as the solvent for preparation, therefore allowing for preparation of a coating agent using the aqueous solvent as the solvent for preparation. This improves the storage stability and the coatability of the coating agent, and also improves the adherence and the hardness of the film.

In this case, although a solubility of the polymerization initiator in an aqueous solvent is not particularly limited, it is preferable that the polymerization initiator are soluble, in particular, 1 mass % or more in water at 25° C. A reason for this is that this secures solubility of the polymerization initiator in water, therefore making it easier to prepare the coating agent using an aqueous solvent. This further improves the storage stability and the coatability of the coating agent, and also further improves the hardness of the film. The water described here is, for example, ion-exchanged water.

Specifically, examples of the water-soluble polymerization initiator include respective compounds represented by A1 to A57.

[Chem. 10]

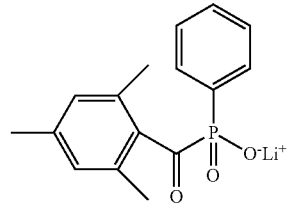

A1

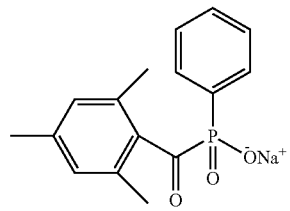

A2

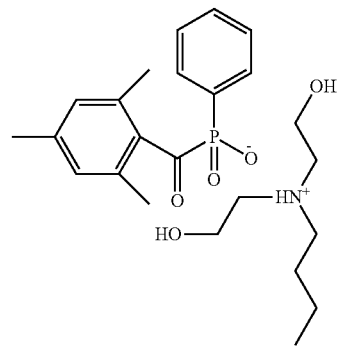

A3

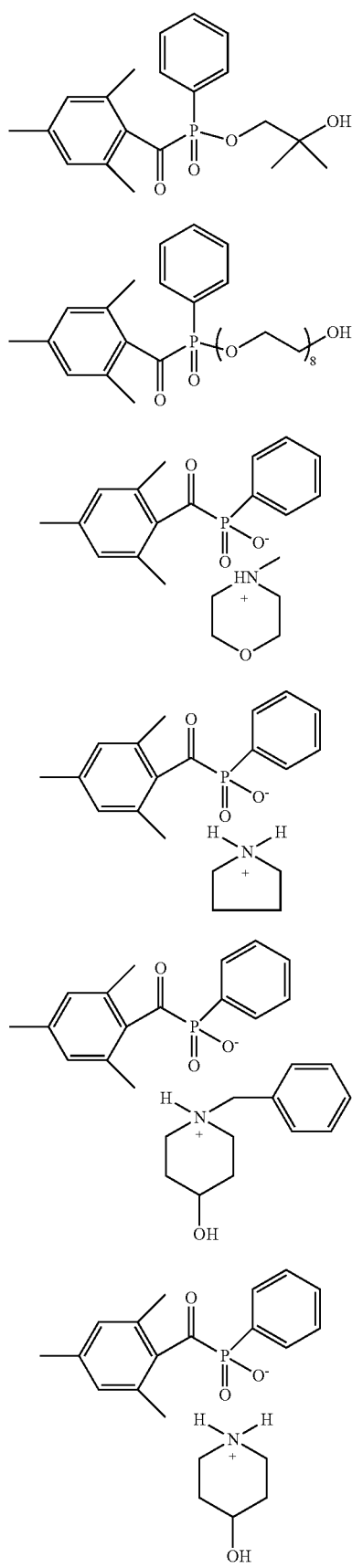
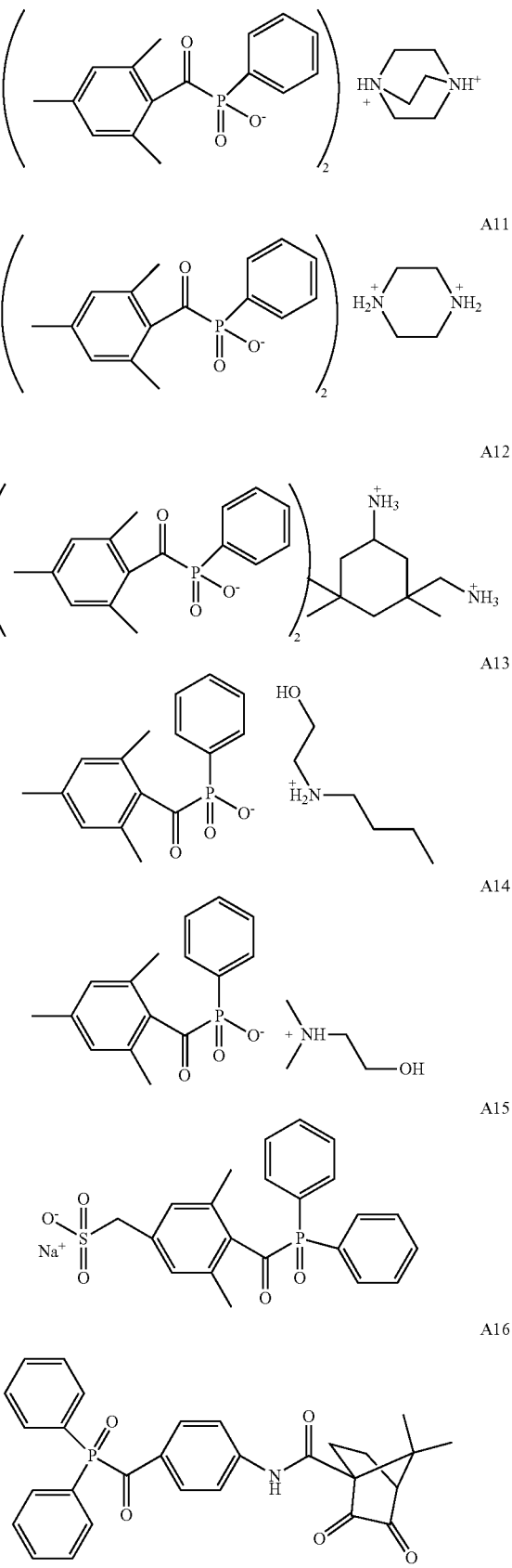

A17
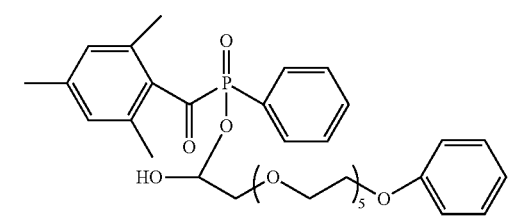
A18
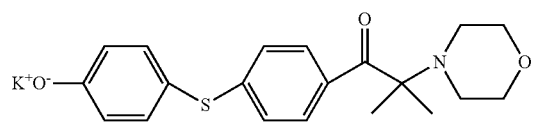
A19
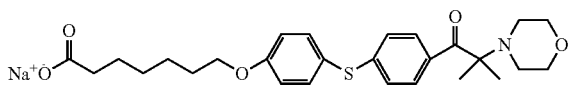
A20
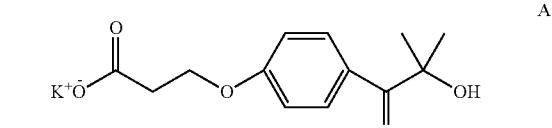
A21
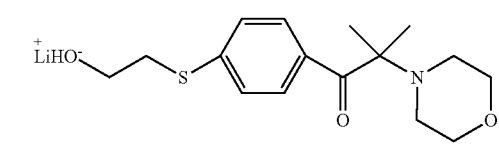
A22
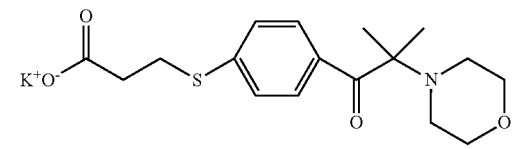
A23
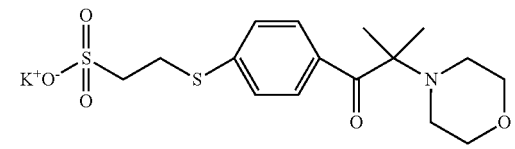
A24
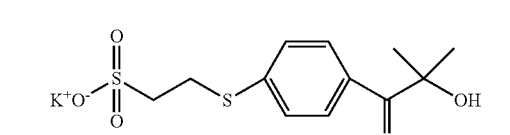
A25
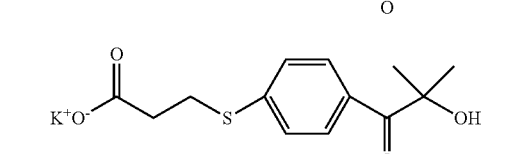
A26
[Chem. 11]
A27
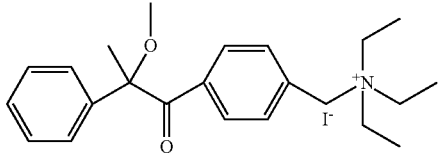
A28
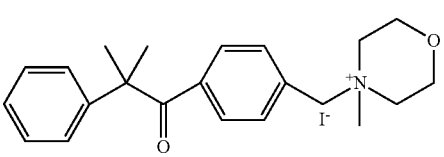
A29
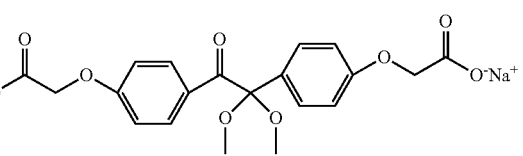
A30
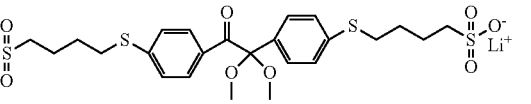
A31
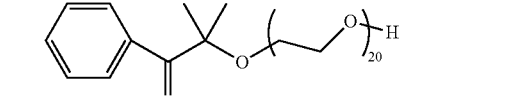
A32
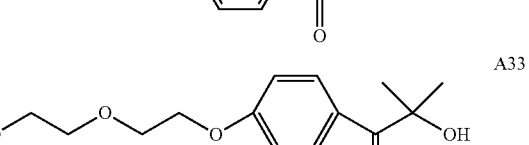
A33
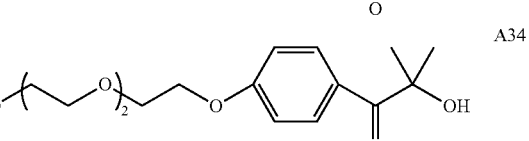
A34
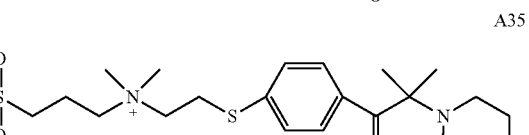
A35
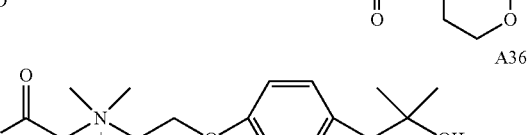
A36
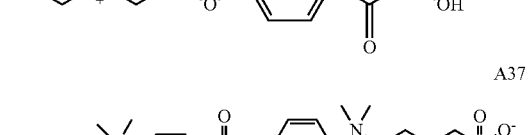
A37
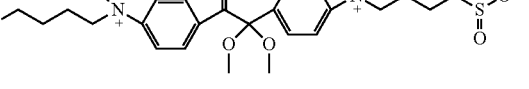

[Chem. 12]
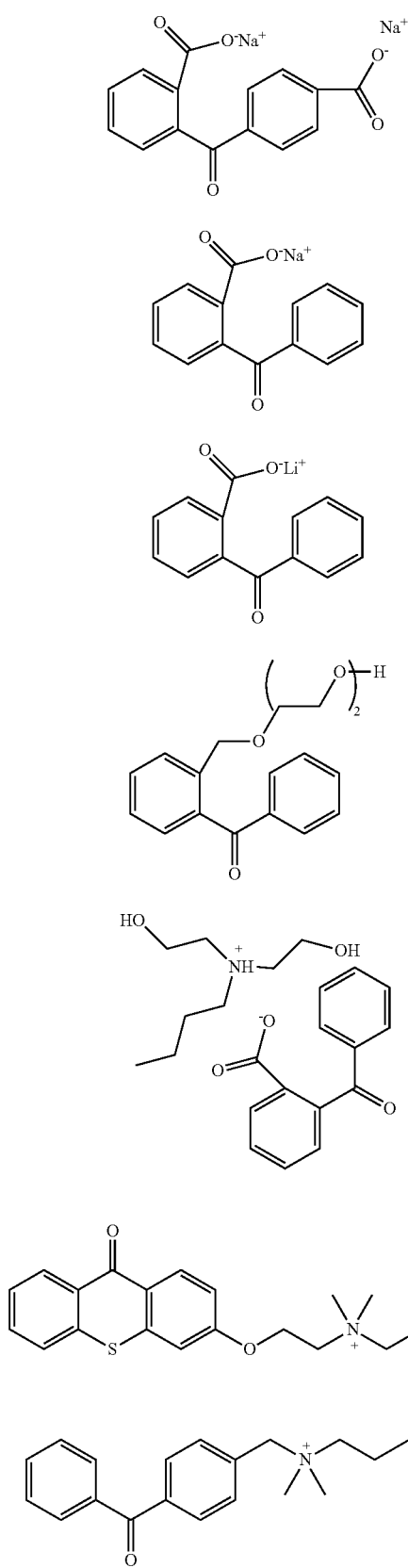
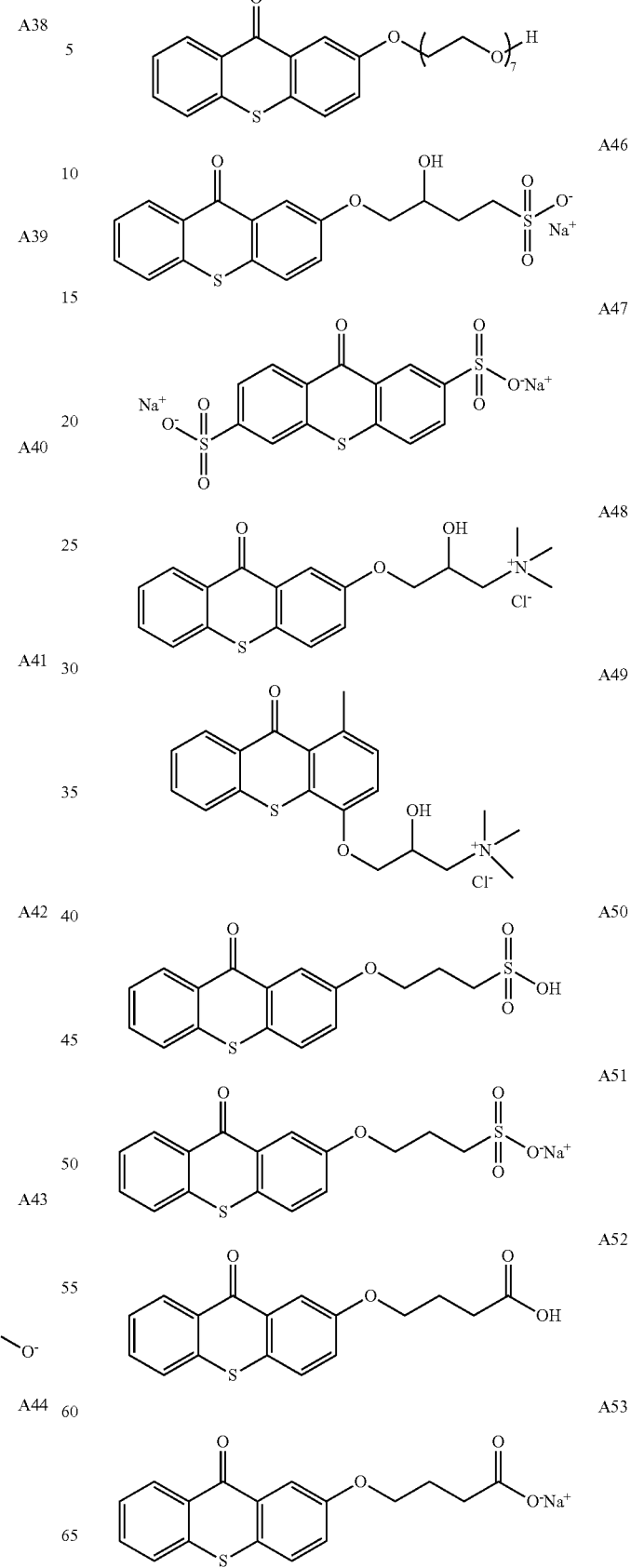

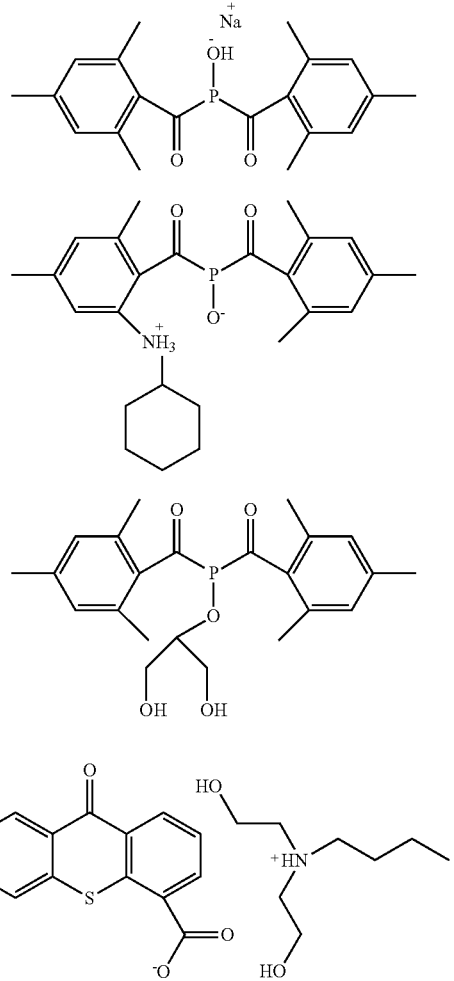

Among the above, an acylphosphine oxide-based initiator is preferable as the water-soluble polymerization initiator. A reason for this is that the acylphosphine oxide-based initiator is high in solubility in water and is sensitive to a light-emitting diode (LED) light source.

(Solvent)

The solvent includes one or more of medium materials in which each of the amide compound and the polymerization initiator is to be dispersed or dissolved. The solvent is not particularly limited in kind, and therefore may be an aqueous solvent that is mixable with pure water at a freely-set ratio, an organic solvent, or a mixture of such an aqueous solvent and the organic solvent.

The term "aqueous solvent" is a generic term for solvents each including water and an organic solvent miscible with water. In other words, the aqueous solvent may be only water, only an organic solvent miscible with water, or a mixture of water and the organic solvent miscible with water. The "organic solvent miscible with water" means an organic solvent that dissolves by 0.01 g or more in 100 g of water at 20° C.

The use of a coating agent using the aqueous solvent provides the following advantages. Firstly, it makes it easier to control a thickness of the film. Secondly, it makes it possible to use not only a base having high resistance to an organic solvent but also a base having low resistance to an organic solvent, therefore expanding the degree of freedom in choosing the kind of base. Thirdly, when the coating agent is applied onto an organic material (e.g., a film including the organic material), it helps to prevent the organic material from being damaged by the coating agent. Fourthly, it reduces an environmental impact upon the use of the coating agent because the aqueous solvent is environmentally friendly.

Examples of the organic solvent miscible with water include ethylene glycol, diethylene glycol, triethylene glycol, propylene glycol, dipropylene glycol, 2-pyrrolidone, N-methyl-2-pyrrolidone, 1,2-propanediol, 1,3-propanediol, 1,2-butanediol, 1,3-butanediol, 1,4-butanediol, 2,3-butanediol, 2,2-dimethyl-1,3-propanediol, 2-methyl-1,3-propanediol, 1,2-pentanediol, 1,5-pentanediol, 2,4-pentanediol, 1,2-hexanediol, 3,5-dimethyl-3-hexyne-2,5-diol, 2,5-hexanediol, hexylene glycol, 1,6-hexanediol, 2-ethyl-1,3-hexanediol, 2,2,4-trimethyl-1,3-pentanediol, 2,5-dimethyl-2,5-hexanediol, sulfolane, 1,4-cyclohexanedimethanol, 2,2-thiodiethanol, 3-pyridylcarbinol, propylene glycol monomethyl ether, dipropylene glycol methyl ether, tripropylene glycol methyl ether, propylene glycol ethyl ether, propylene glycol n-propyl ether, dipropylene glycol n-propyl ether, tripropylene glycol n-propyl ether, tripropylene glycol n-butyl ether, dipropylene glycol n-butyl ether, tripropylene glycol n-butyl ether, propylene glycol t-butyl ether, dipropylene glycol t-butyl ether, propylene glycol phenyl ether, ethylene glycol methyl ether, diethylene glycol methyl ether, triethylene glycol methyl ether, ethylene glycol ethyl ether, diethylene glycol ethyl ether, triethylene glycol ethyl ether, ethylene glycol n-propyl ether, ethylene glycol n-butyl ether, diethylene glycol n-butyl ether, triethylene glycol n-butyl ether, ethylene glycol n-hexyl ether, diethylene glycol n-hexyl ether, and ethylene glycol phenyl ether.

Among the above, as the organic solvent miscible with water, a lower alcohol having carbon number of 5 or less is preferable. A reason for this is that this markedly improves solubility in water.

Examples of the organic solvent include ketones, an ether-based solvent, an ester-based solvent, a cellosolve-based solvent, an alcohol-based solvent (excluding an alcohol-based solvent belonging to the aqueous solvent), an ether ester-based solvent, a BTX-based solvent, an aliphatic hydrocarbon-based solvent, a terpene hydrocarbon oil, a halogenated aliphatic hydrocarbon-based solvent, and a halogenated aromatic hydrocarbon-based solvent.

Examples of the ketones include methyl ethyl ketone, acetone, and cyclohexanone. Examples of the ether-based solvent include dioxane, tetrahydrofuran, and 1,2-dimethoxyethane. Examples of the ester-based solvent include methyl acetate, ethyl acetate, and propyl acetate. Examples of the cellosolve-based solvent include ethylene glycol monomethyl ether and ethylene glycol monoethyl ether. Examples of the alcohol-based solvent include methanol and ethanol. Examples of the ether ester-based solvent include ethylene glycol monomethyl acetate and ethylene glycol monoethyl acetate. Examples of the BTX-based solvent include benzene, toluene, and xylene. Examples of the aliphatic hydrocarbon-based solvent include hexane, heptane, octane, and cyclohexane. Examples of the terpene hydrocarbon oil include turpentine oil, D-limonene, and pinene. Examples of the halogenated aliphatic hydrocarbon-based solvent include carbon tetrachloride, chloroform, trichloroethylene, methylene chloride, and 1,2-dichloroethane. Examples of the halogenated aromatic hydrocarbon-based solvent include chlorobenzene. In addition, examples of the organic solvent may include aniline, triethylamine, pyridine, acetic acid, acetonitrile, carbon disulfide, N,N-dimethylformamide, N,N-dimethylacetamide, N-methylpyrrolidone, and dimethyl sulfoxide.

(Additives)

The polymerizable composition may further include one or more of additives.

(Polyfunctional Acrylamide Compound and Monofunctional Acrylamide Compound)

The additive includes, for example, a polyfunctional acrylamide compound, a monofunctional acrylamide compound, or both. In other words, the additive may include only the polyfunctional acrylamide compound, only the monofunctional acrylamide compound, or both. The polyfunctional acrylamide compound is a compound having two or more groups (amide-bond-containing groups) represented by Formula (3) in a molecule. Note that the amide compound represented by Formula (1) is excluded from the polyfunctional acrylamide compound described here. The monofunctional acrylamide compound is a compound represented by Formula (4). A reason for using such a polyfunctional acrylamide compound, such a monofunctional acrylamide compound, or both is that this further improves the storage stability of the coating agent, and also further improves the hardness of the film. Note that only one kind of each of the polyfunctional acrylamide compound and the monofunctional acrylamide compound may be used, or two or more kinds of each of the polyfunctional acrylamide compound and the monofunctional acrylamide compound may be used.

[Chem. 13]

(3)

where:
R8 is one of a hydrogen group and a monovalent unsubstituted hydrocarbon group; and
"*" represents a dangling bond.

[Chem. 14]

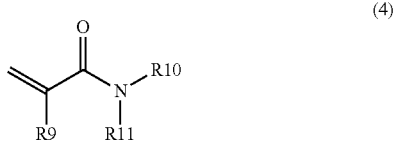

(4)

where: R9 is one of a hydrogen group and a monovalent unsubstituted hydrocarbon group. Each of R10 and R11 is one of a hydrogen group, a monovalent unsubstituted hydrocarbon group, a monovalent unsubstituted heterocyclic group, a monovalent substituted hydrocarbon group, and a monovalent substituted heterocyclic group;
R10 and R11 are bondable to each other to form a ring;
the monovalent substituted hydrocarbon group is a group obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or the divalent linking group represented by each of Formulae (2-1) to (2-8) into a monovalent unsubstituted hydrocarbon group; and
the monovalent substituted heterocyclic group is a group obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (2-1) to (2-8) into a monovalent unsubstituted heterocyclic group.

(Polyfunctional Acrylamide Compound)

R8 is not particularly limited in kind as long as R8 is one of a hydrogen group and a monovalent unsubstituted hydrocarbon group. Details of the monovalent unsubstituted hydrocarbon group are as described above. That is, because the carbon number of the monovalent unsubstituted hydrocarbon group is preferably as small as possible, the monovalent unsubstituted hydrocarbon group is preferably a methyl group. A reason for this is that this improves properties including, without limitation, the solubility and the compatibility of the polyfunctional acrylamide compound.

Note that the polyfunctional acrylamide compound includes two or more amide-bond-containing groups and a central group to which the two or more amide-bond-containing groups are bonded. The central group is not particularly limited in kind, and examples thereof include a hydrocarbon group having a valence of two or more. That is, a bond of the amide-bond-containing group with "*" in Formula (3) is bonded to a carbon atom of the hydrocarbon group having a valence of two or more. Examples of the hydrocarbon group having a valence of two or more include a group obtained by removing two or more hydrogen groups from each of an alkane, an alkene, an alkyne, a cycloalkane, and an aromatic ring. Details of each of the alkane, the alkene, the alkyne, the cycloalkane, and the aromatic ring are as described above.

Including the polyfunctional acrylamide compound in the polymerizable composition particularly improves the storage stability of the polymerizable composition and the hardness of the film (the cured material).

(Monofunctional Acrylamide Compound)

R9 is not particularly limited in kind as long as R9 is one of a hydrogen group and a monovalent unsubstituted hydrocarbon group. Details of the monovalent unsubstituted hydrocarbon group are as described above. That is, because the carbon number of the monovalent unsubstituted hydrocarbon group is preferably as small as possible, the monovalent unsubstituted hydrocarbon group is preferably a methyl group. A reason for this is that this improves properties including, without limitation, the solubility and the compatibility of the monofunctional acrylamide compound.

Each of R10 and R11 is not particularly limited in kind as long as each of R10 and R11 is one of a hydrogen group, a monovalent unsubstituted hydrocarbon group, a monovalent unsubstituted heterocyclic group, a monovalent substituted hydrocarbon group, and a monovalent substituted heterocyclic group. Details of each of the monovalent unsubstituted hydrocarbon group, the monovalent unsubstituted heterocyclic group, the monovalent substituted hydrocarbon group, and the monovalent substituted heterocyclic group are as described above. Note that the respective kinds of R10 and R11 may be the same as or different from each other. In addition, R10 and R11 may be bonded to each other to form a ring, for example. The ring (a cyclic compound) formed by the bonding of R10 and R11 to each other is not particularly limited in kind, but in particular, is preferably a ring such as ethylenimine, pyrrolidine, piperidine, hexamethyleneimine, azocane, azonane, or morpholine. A reason for this is that this improves the hardness of the film (the cured material).

Including the monofunctional acrylamide compound in the polymerizable composition particularly improves the storage stability of the polymerizable composition and the coatability of the coating agent.

(Polyfunctional Acrylic Acid Ester)

Further, the additive includes, for example, one or more of polyfunctional acrylic acid esters. A reason for this is that this further improves the hardness of the film.

The polyfunctional acrylic acid ester is not particularly limited in kind, and examples thereof include pentaerythritol triacrylate, pentaerythritol tetraacrylate, glyceryl diacrylate, and glyceryl triacrylate. In addition, examples of the polyfunctional acrylic acid ester include a water-soluble polyfunctional acrylic acid ester having superior water solubility such as alkoxylated bisphenol A acrylate, alkoxylated glycerin acrylate, ethoxylated polyglycerin acrylate, glycerin di/triacrylate, pentaerythritol acrylate, or ethylene oxide modified polyglycerin polyacrylate. In addition, examples of commercially available polyfunctional acrylic acid ester include: A-BPE-30, A-GLY-9E, A-GLY-20E, and A-PG-5054E available from Shin-Nakamura Chemical Co., Ltd.; MT-3560 and MT-3548 available from Toagosei Co., Ltd.; and SA-TE60 and SA-TE6 available from Sakamoto Yakuhin Kogyo Co., Ltd. Among the above, as the polyfunctional acrylic acid ester, the water-soluble polyfunctional acrylic acid ester that allows for superior water solubility is preferable.

Including the polyfunctional acrylic acid ester in the polymerizable composition particularly improves properties including, without limitation, chemical resistance and scratch resistance of the film.

(Others)

In addition, the additive may include, for example, any of a monofunctional acrylic acid ester, a leveling agent, a coupling agent, a sensitizer, and a surfactant.

The monofunctional acrylic acid ester is not limited in kind as long as the monofunctional acrylic acid ester includes one or more of compounds each having one acrylic group in a molecule. Specifically, examples of the monofunctional acrylic acid ester include stearyl acrylate, tetradecyl acrylate lauryl acrylate, methoxytriethylene glycol acrylate, methoxy polyethylene glycol monoacrylate, methoxy polypropylene glycol monoacrylate acrylate, isoboronyl acrylate, 2-hydroxy-3-phenoxypropyl acrylate, 2-acryloyloxyethyl phthalate, 2-acryloyloxyethyl hexahydrophthalate, 2-hydroxybutyl acrylate, 4-hydroxybutyl acrylate, benzyl acrylate, cyclohexyl acrylate, nonylphenoxypolypropylene glycol acrylate, phenoxytetraethylene glycol acrylate, methoxytetraethylene glycol metacrylate, methoxypolypropylene glycol methacrylate, and methacryloyloxyethyl terephthalate.

In addition, examples of commercially available monofunctional acrylic acid ester include: A-S, A-MS, AM-30G, AM-90G, AM-30PG, A-IB, 702A, M-40G, M-30PG, and CB-3 available from Shin-Nakamura Chemical Co., Ltd.; ARONIX M-5400, M-117, and M-102 available from Toagosei Co., Ltd.; HOA-HH and HOB-A available from Kyoeisha Chemical Co., Ltd.; and 4-HBA, Viscoat #160, and Viscoat #155 available from Osaka Organic Chemical Industry Ltd.

Including the monofunctional acrylic acid ester in the polymerizable composition particularly improves the transparency of the film.

The leveling agent is not particularly limited in kind as long as the leveling agent includes one or more of materials that are able to exhibit a leveling effect. Therefore, a known leveling agent can be used as the leveling agent. In particular, for example, a silicone-based leveling agent or a fluorine-based leveling agent is preferable as the leveling agent.

As the silicone-based leveling agent, a commercially available silicone-based leveling agent can be used. Specifically, examples of the commercially available silicone-based leveling agent include: BYK-300, BYK-306, BYK-310, BYK-315, BYK-313, BYK-320, BYK-322, BYK-323, BYK-325, BYK-330, BYK-344, BYK-370, BYK-UV3510, BYK-UV3570, BYK-3550, and BYK-SILCLEAN 3700 available from BYK Japan KK; ACFS180, ACFS360, and AC S20 available from Algin Chemie e. K.; POLYFLOW KL-400X and POLYFLOW KL-400HF available from Kyoeisha Chemical Co., Ltd.; KP-323, KP-326, KP-341, KP-104, KP-110, and KP-112 available from Shin-Etsu Chemical Co., Ltd.; and LP-7001, LP-7002, 8032ADDITIVE, 57ADDITIVE, L-7604, FZ-2110, FZ-2105, 67ADDITIVE, 8618ADDITIVE, 3ADDITIVE, and 56ADDITIVE available from Dow Toray Co., Ltd.

Examples of a commercially available aqueous silicone-based leveling agent include: DISPARLON LS-009, DISPARLON LS-430, and DISPARLON AQ-7120 available from Kusumoto Chemicals, Ltd.; BYK-301, BYK-302, BYK-307, BYK-331, BYK-333, BYK-337, BYK-341, BYK-345, BYK-346, BYK-347, BYK-348, BYK-349, BYK-375, BYK-377, BYK-378, BYK-UV 3500, and BYK-SILCLEAN 3720 available from BYK Japan KK; POLYFLOW WS, POLYFLOW WS-314, POLYFLOW KL-100, POLYFLOW KL-401, POLYFLOW KL-402, POLYFLOW KL-403, and POLYFLOW KL-404 available from Kyoeisha Chemical Co., Ltd.; TEGO Flow 425, TEGO Glide 100, TEGO Glide 110, TEGO Glide 410, TEGO Glide 440, TEGO Glide 450, TEGO Glide 482, and TEGO Glide 485 available from Evonik Japan Co., Ltd.

Among the above, as the silicone-based leveling agent, the aqueous silicone-based leveling agent is preferable. A reason for this is that the aqueous silicone-based leveling agent has superior compatibility with an aqueous solvent.

As the fluorine-based leveling agent, a commercially available fluorine-based leveling agent can be used. Specifically, examples of the commercially available fluorine-based leveling agent include: OPTOOL DSX and OPTOOL DAC-HP available from Daikin Industries, Ltd.; Surflon S-420, Surflon S-611, and Surflon S-651 available from AGC Seimi Chemical Co., Ltd.; BYK-340 available from BYK Japan KK; AC110a and AC100a available from Algin Chemie e. K.; MEGAFACE EXPTP-2066, MEGAFACE F-430, MEGAFACE F-472SF, MEGAFACE F-477, MEGAFACE F-552, MEGAFACE F-554, MEGAFACE F-555, MEGAFACE RS-72-K, MEGAFACE RS-75, MEGAFACE F-556, MEGAFACE EXPTF-1367, MEGAFACE EXPTF-1437, MEGAFACE F-558, and MEGAFACE EXPTF-1537 available from DIC Corporation; FC-4430 and FC-4432 available from 3M Japan Limited (former Sumitomo 3M Limited); Ftergent A-K, Ftergent 501, Ftergent 251, Ftergent 222F, Ftergent 208G, Ftergent 300, and Ftergent 310 available from Neos Company Limited; and PF-136A, PF-156A, PF-151N, PF-636, PF-6320, PF-656, PF-6520, PF-651, PF-652, and PF-3320 available from Kitamura Chemicals Co., Ltd.

Examples of a commercially available aqueous fluorine-based leveling agent include: MEGAFACE F-114, MEGAFACE 410, MEGAFACE 444, MEGAFACE 477, MEGAFACE 553, MEGAFACE 556, MEGAFACE 559, MEGAFACE 569, MEGAFACE 574, and MEGAFACE R-94 available from DIC Corporation; Surflon S-211, Surflon S-212, Surflon S-221, Surflon S-231, Surflon S-241, Surflon S-242, Surflon S-243, and Surflon S-386 available from AGC Seimi Chemical Co., Ltd.; Ftergent 100, Ftergent 100C, Ftergent 110, Ftergent 150, Ftergent 150CH, Ftergent 320, Ftergent 400SW, Ftergent 212M, Ftergent 215M, Ftergent 250, Ftergent 730FL, Ftergent 683, Ftergent 602A, and Ftergent 681 available from Neos Co. Ltd.

Among the above, as the fluorine-based leveling agent, the aqueous fluorine-based leveling agent is preferable. A reason for this is that the aqueous fluorine-based leveling agent has superior compatibility with an aqueous solvent.

(Mixture Ratio)

A composition (a mixture ratio between components) of the polymerizable composition is not particularly limited. Note that the polymerizable composition may include, together with the amide compound and the polymerization initiator, only the polyfunctional acrylamide compound, only the monofunctional acrylamide compound, or both.

Here, for example, a composition (excluding the solvent and the additive) in a case where the polymerizable composition includes the polyfunctional acrylamide compound and the monofunctional acrylamide compound together with the amide compound and the polymerization initiator is as described below.

In a case where the total sum of the amide compound, the polymerization initiator, the polyfunctional acrylamide compound, and the monofunctional acrylamide compound is assumed to be 100 mass %, a content of the amide compound is preferably from 3 mass % to 80 mass % both inclusive, more preferably from 5 mass % to 75 mass % both inclusive, and still more preferably from 10 mass % to 70 mass % both inclusive. A reason for this is that such a content allows for improvement in the storage stability and the coatability of the coating agent, and also for improvement in the adherence and the hardness of the film.

In the above-described case where the total sum is assumed to be 100 mass %, a content of the polymerization initiator is preferably from 0.1 mass % to 15 mass % both inclusive, and more preferably from 0.5 mass % to 10 mass % both inclusive. A reason for this is that such a content allows for improvement in the storage stability and the coatability of the coating agent, and also for improvement in the adherence and the hardness of the film.

In the above-described case where the total sum is assumed to be 100 mass %, a content of the polyfunctional acrylamide compound is preferably from 0 mass % to 50 mass % both inclusive, more preferably from 4 mass % to 45 mass %, and still more preferably from 10 mass % to 40 mass % both inclusive. A reason for this is that such a content allows for improvement in the storage stability and the coatability of the coating agent, and also for improvement in the adherence and the hardness of the film. Note that a reason why the content range of the polyfunctional acrylamide compound includes 0 mass % is that the polymerizable composition need not include the polyfunctional acrylamide compound.

In the above-described case where the total sum is assumed to be 100 mass %, a content of the monofunctional acrylamide compound is preferably from 0 mass % to 90 mass % both inclusive, more preferably from 5 mass % to 80 mass % both inclusive, and still more preferably from 10 mass % to 70 mass % both inclusive. A reason for this is that such a content allows for improvement in the storage stability and the coatability of the coating agent, and also for improvement in the adherence and the hardness of the film.

Note that a reason why the content range of the monofunctional acrylamide compound includes 0 mass % is that the polymerizable composition need not include the monofunctional acrylamide compound.

In addition, in a case where the total sum of the amide compound, the polymerization initiator, the polyfunctional acrylamide compound, the monofunctional acrylamide compound, the polyfunctional acrylic acid ester, and the monofunctional acrylic acid ester is assumed to be 100 mass %, a content of the polyfunctional acrylic acid ester is not particularly limited, but in particular, is preferably from 0 mass % to 50 mass % both inclusive, more preferably from 5 mass % to 45 mass % both inclusive, and still more preferably from 10 mass % to 40 mass % both inclusive. A reason for this is that such a content allows for improvement in the storage stability and the coatability of the coating agent, and also for improvement in the adherence and the hardness of the film. Note that a reason why the content range of the polyfunctional acrylic acid ester includes 0 mass % is that the polymerizable composition need not include the polyfunctional acrylic acid ester.

Details of a content of the monofunctional acrylic acid ester are similar to those of the content of the polyfunctional acrylic acid ester described above.

[Manufacturing Method]

In a case of manufacturing the coating agent which is a liquid polymerizable composition, the amide compound and the polymerization initiator are put into a solvent, following which the solvent is stirred. In this case, the polyfunctional acrylamide compound, the monofunctional acrylamide compound, or both may be further added to the solvent. Thus, the materials including, without limitation, the amide compound and the polymerization initiator are dispersed or dissolved in the solvent. As a result, the coating agent is prepared.

[Action and Effects]

According to the above-described polymerizable composition, the polymerizable composition includes the amide compound represented by Formula (1) and the polymerization initiator. In this case, firstly, properties including, without limitation, the solubility and the compatibility of the amide compound are secured, which results in improvement in the storage stability (transparency) and the coatability of the coating agent. Secondly, a dense film (the cured material) is formed with the use of the coating agent by using the polymerization (curing) reaction of the amide compound, which results in improvement in the adherence of the film to the base. Thirdly, a film having superior physical strength is formed with use of the coating agent, which results in improvement in the hardness of the film. Accordingly, the adherence and the hardness of the film are improved while the storage stability and the coatability of the coating agent are secured. As a result, it is possible to achieve superior physical properties. This makes it possible to form a film (a cured material) highly sensitive to an ultraviolet ray having a long wavelength, i.e., from 360 nm to 400 nm both inclusive, applied from a light source typified by an LED light source.

In particular, X1 in Formula (1) may be —O—. This improves the adherence of the film to the base and also improves the hardness of the film. Accordingly, it is possible to achieve higher effects.

Moreover, n1 to n4 in Formula (1) may satisfy (n1+n2+n3+n4)=2. This sufficiently improves properties including, without limitation, the solubility and the compatibility of the amide compound. Accordingly, it is possible to achieve higher effects. In this case, n1 to n4 may further satisfy (n1+n3)≥1 and (n2+n4)≥1. This secures properties including, without limitation, the solubility and the compatibility of the amide compound. Accordingly, it is possible to achieve higher effects.

Moreover, each of the (n1+n2+1)-valent unsubstituted hydrocarbon group and the (n3+n4+1)-valent unsubstituted hydrocarbon group may have carbon number from 1 to 30 both inclusive, and each of the (n1+n2+1)-valent unsubstituted heterocyclic group and the (n3+n4+1)-valent unsubstituted heterocyclic group may have carbon number from 2 to 30 both inclusive. This improves properties including, without limitation, the solubility and the compatibility of the amide compound. Accordingly, it is possible to achieve higher effects.

Moreover, each of R1 to R4 in Formula (1) may be a hydrogen group. This improves the solubility of the amide compound in the aqueous solvent. Accordingly, it is possible to achieve higher effects.

Moreover, the polymerizable composition may further include the polyfunctional acrylamide compound, the monofunctional acrylamide compound, or both. This further improves the storage stability and the coatability of the coating agent, and further improves the adherence and the hardness of the film. Accordingly, it is possible to achieve higher effects.

Moreover, the polymerizable composition may further include the aqueous solvent. It is therefore possible to prepare the coating agent using the aqueous solvent. This further improves the storage stability and the coatability of the coating agent, and further improves the adherence and the hardness of the film. Accordingly, it is possible to achieve higher effects. In this case, the polymerization initiator may be a water-soluble polymerization initiator that dissolves by 1 mass % or more in water at 25° C. This further improves the storage stability and the coatability of the coating agent, and further improves the adherence and the hardness of the film. Accordingly, it is possible to achieve further higher effects.

<3. Cured Material and Method of Manufacturing Cured Material>

Next, a description is given of a cured material of an embodiment of the present invention using the above-described polymerizable composition and a method of manufacturing such a cured material of an embodiment of the present invention.

[Configuration]

The cured product to be described here is a cured product formed by subjecting the amide compound in the polymerizable composition to a polymerization (curing) reaction with use of the polymerization initiator as described above. More specifically, for example, in a case where the film is formed by applying the coating agent onto a surface of a base, the film includes the cured material.

[Manufacturing Method]

In a case of manufacturing the cured material, first, the coating agent including the amide compound and the polymerization initiator is prepared by the above-described procedure.

Thereafter, the coating agent is supplied on a surface of a base to thereby apply the coating agent onto the surface of the base, following which the applied coating agent is dried. As a result, a coating film including the polymerizable composition (the amide compound and the polymerization initiator) is formed on the surface of the base.

The base is not particularly limited in kind, and examples thereof include metal, wood, rubber, plastic, glass, ceramic, paper, and cloth. A method of applying the coating agent is not particularly limited, and examples thereof include spin coating, bar coating, roll coating, curtain coating, various printing methods, and an immersion method.

Lastly, the coating film is irradiated with an active energy ray. The active energy ray is not particularly limited in kind, and examples thereof include an ultraviolet ray. Conditions including, without limitation, a wavelength, irradiation intensity, and an irradiation time of the ultraviolet ray can be freely set. Specifically, the wavelength is, for example, from 200 nm to 400 nm both inclusive. The irradiation intensity is, for example, from 1 mW/cm to 500 mW/cm both inclusive, preferably 5 mW/cm to 300 mW/cm both inclusive. Converted into an irradiation amount, the above is, for example, from 10 mJ/cm$^2$ to 1000 mJ/cm$^2$, and preferably from 100 mJ/cm$^2$ to 500 mJ/cm$^2$. The irradiation time is, for example, from 1 second to 500 seconds both inclusive, and preferably from 5 seconds to 300 seconds both inclusive.

Thus, the polymerization (curing) reaction of the amide compound proceeds with use of the polymerization initiator in the coating film, and therefore, a cured product (a cured material) of the amide compound is formed. As a result, a film including the cured material is formed.

In the case of manufacturing the cured material, the above-described procedure of manufacturing the cured material may be repeated to laminate a plurality of cured materials.

Here, in order to manufacture the cured material, instead of irradiating the coating film with the active energy ray, the coating film may be heated. In addition, in order to produce the cured material, the coating film may be irradiated with the active energy ray while being heated. Conditions including, without limitation, a heating temperature and a heating time can be freely set. In these cases also, the polymerization (curing) reaction of the amide compound proceeds, and therefore, a film including the cured product (the cured material) of the amide compound is formed.

[Action and Effects]

According to this cured material, the cured material is formed using a polymerizable composition, and the polymerizable composition has a configuration similar to that of the polymerizable composition of the embodiment of the present invention described above. Accordingly, for reasons similar to those in the case described in relation to the polymerizable composition, the adherence and the hardness of the film improve while the storage stability and the coatability of the coating agent are secured. As a result, it is possible to achieve superior physical properties.

Other action and effects related to the cured material are similar to other action and effects related to the polymerizable composition described above.

Moreover, according to the method of manufacturing the cured material, the polymerizable composition is irradiated with the active energy ray. Therefore, the polymerization (curing) reaction of the amide compound proceeds sufficiently and stably in accordance with the irradiation of the active energy, and the cured material is thereby manufactured. This makes it possible to obtain the cured material having superior physical properties. In this case, in particular, in order to obtain the cured material having superior physical properties, only a process of irradiating the polymerizable composition with the active energy ray is used. Therefore, it is possible to easily and stably manufacture the cured material having superior physical properties. Specifically, such a method of manufacturing the cured material is advantageous in, for example: that it shortens the process of manufacturing the cured product; that it suppresses damage on the base; and that it allows for patterning (so manufacturing the cured material as to provide a desired pattern).

<4. Uses>

Uses of the amide compound, the polymerizable composition, and the cured material described above are not particularly limited, and examples thereof include various lenses, various films, and various functional films. Specifically, examples thereof include eye glasses, an imaging lens, an antistatic film, an optical film, an electrically conductive film, a protective film, a heat-ray blocking material, a transfer foil, a printing plate, an insulating varnish, an insulating sheet, a laminated plate, a printed circuit board, a substrate for a flexible display, a substrate for a touch panel, a mask for printing, a molding material, putty, a building material, a nail art material, cosmetics, siding, a glass fiber impregnation agent, a filler agent, passivation films for a semiconductor, a solar cell, and the like, an interlayer insulating film, a protective covering film, a prismatic lens sheet for a backlight of a liquid crystal display, a Fresnel lens sheet for a screen of a projection television, a lens unit of a lens sheet for a lenticular lens sheet, a backlight using any of the above-described sheets, a protective film and a spacer for a liquid crystal color filter, a DNA separation chip, a microreactor, a nano-bio device, a recording material for a hard disk, a solid-state imaging device, a solar panel, a light-emitting diode, an organic light-emitting device, an electrode protective material, a luminescent film, a fluorescent film, an MEMS device, an actuator, a hologram, a plasmon device, a polarizing plate, a polarizing film, an alignment film, a microlens, an optical device, a retardation film, an optical connector, an optical waveguide, a casting agent for optical shaping, food, a beverage container, a packaging material for food, a dental material, a sanitary ware, and a housing equipment. Examples of the housing equipment include a bathtub.

EXAMPLES

Examples of the present invention are described in detail below.

Experiment Examples 1 to 43

By a procedure described below, the amide compound represented by Formula (1) was synthesized and a polymerizable composition was prepared using the synthesized amide compound, following which physical properties of the polymerizable composition and the physical properties of a cured material manufactured using the polymerizable composition were evaluated.
[Synthesis of Amide Compound]

Here, respective compounds represented by Formulae (1-1) to (1-3), (1-6), (1-10), and (1-16) were synthesized.
(Synthesis of Compound Represented by Formula (1-1))

First, 11.5 g of N-(2-hydroxyethyl)acrylamide and 0.03 g of 4-methoxyphenol were put into a four-necked flask to be thereby mixed together. Thereafter, while stirring the mixture at room temperature, 14.1 g of 2-acryloyloxyethyl isocyanate was dropped into the mixture over one hour. Thereafter, the four-necked flask was heated to thereby increase the temperature of the mixture to 80° C. over one hour, following which the mixture was stirred at the same temperature for one hour. This caused the mixture to react, and a product was obtained. Here, the product was analyzed by Fourier transform-infrared spectroscopy (FT-IR). As a result, there was no isocyanate (NCO) group left. Accordingly, it was confirmed that the reaction of the mixture was completed. Lastly, the product was cooled until the temperature of the product reached room temperature of the product reached room temperature. Thus, 25.3 g of a white solid (a white crystal) was obtained.

The product was analyzed by liquid chromatography/mass spectrometry (LC/MS) and nuclear magnetic resonance (NMR). As a result, it was confirmed that the product was the compound represented by Formula (1-1). Details of the analytical result of the product are as follows.

MS m/z: 257 (M+H)

$^1$H-NMR (400 MHz) 3.4-3.6 (m, 4H) 4.12 (t, 2H) 4.26 (t, 2H) 5.0-5.2 (brs, 1H) 5.6 (dd, 1H) 5.86 (d, 1H) 6.05-6.17 (m, 2H) 6.28 (d, 1H) 6.3-6.4 (brs, 1H) 6.43 (dd, 1H)
(Synthesis of Compound Represented by Formula (1-2))

First, 5.55 g of N-(2-hydroxylethyl)acrylamide and 0.01 g of 2,6-di-tert-butyl-4-methylphenol were put into a four-necked flask to be thereby mixed together. Thereafter, while stirring the mixture at room temperature, 10.0 g of 2-methacryloyloxyethyl isocyanate was dropped into the mixture over one hour. Thereafter, the four-necked flask was heated to thereby increase the temperature of the mixture to 80° C. over one hour, following which the mixture was stirred at the same temperature for one hour. This caused the mixture to react, and a product was obtained. Here, the product was analyzed by FT-IR. As a result, there was no isocyanate group left. Accordingly, it was confirmed that the reaction of the mixture was completed. Lastly, the product was cooled until the temperature of the product reached room temperature. Thus, 25.3 g of a white solid was obtained.

The product was analyzed by LC/MS and NMR. As a result, it was confirmed that the product was the compound represented by Formula (1-2). Details of the analytical result of the product are as follows.

MS m/z: 271 (M+H)

$^1$H-NMR (400 MHz) 1.95 (m, 3H) 3.50 (m, 2H) 3.58 (m, 2H) 4.20-4.27 (m, 4H) 5.6 (dd, 1H) 5.2 (brs, 1H) 5.59-5.68 (m, 2H) 6.1-6.3 (m, 3H) 6.3-6.4 (brs, 1H) 6.43 (dd, 1H)
(Synthesis of Compound Represented by Formula (1-6))

First, 10.0 g of N-(2-(2-hydroxyethoxy)ethyl)acrylamide and 0.01 g of 2,6-di-tert-butyl-4-methylphenol were put into a four-necked flask to be thereby mixed together. Thereafter, while stirring the mixture at room temperature, 8.86 g of 2-acryloyloxyethyl isocyanate was dropped into the mixture over one hour. Thereafter, the four-necked flask was heated to thereby increase the temperature of the mixture to 80° C. over one hour, following which the mixture was stirred at the same temperature for one hour. This caused the mixture to react, and a product was obtained. Here, the product was analyzed by FT-IR. As a result, there was no isocyanate group left. Accordingly, it was confirmed that the reaction of the mixture was completed. Lastly, the product was cooled until the temperature of the product reached room temperature. Thus, 17.7 g of a colorless (transparent) oil was obtained.

The product was analyzed by LC/MS and NMR. As a result, it was confirmed that the product was the compound represented by Formula (1-6). Details of the analytical result of the product are as follows.

MS m/z: 301 (M+H)

$^1$H-NMR (400 MHz) 3.4-3.6 (m, 8H) 4.18-4.30 (m, 4H) 5.37 (brs, 1H) 5.59-5.65 (m, 1H) 5.83-5.89 (m, 1H) 6.06-6.22 (m, 2H) 6.24-6.33 (m, 1H) 6.4-6.5 (m, 1H) 6.5-6.6 (brs, 1H)
(Synthesis of Compound Represented by Formula (1-10))

First, 2.0 g of N,N'-diacryloyl-1,2-dihydroxyethylenediamine, 0.01 g of 4-methoxyphenol, and 9 g of N-methylpyrrolidone were put into a four-necked flask to be thereby mixed. Thereafter, while stirring the mixture at room temperature, 2.82 g of 2-acryloxyethyl isocyanate was dropped into the mixture over one hour. Thereafter, the four-necked flask was heated to thereby increase the temperature of the mixture to 80° C. over one hour, following which the mixture was stirred at the same temperature for one hour. This caused the mixture to react, and a product was obtained. Here, the product was analyzed by FT-IR. As a result, there was no isocyanate group left. Accordingly, it was confirmed that the reaction of the mixture was completed. Thereafter, the product was cooled until the temperature of the product reached room temperature. Lastly, 10 g of acetone was added to the product, following which a precipitate was filtered and dried. Thus, 3.1 g of a white solid was obtained.

The product was analyzed by LC/MS and NMR. As a result, it was confirmed that the product was the compound represented by Formula (1-10). Details of the analytical result of the product are as follows.

MS m/z: 483 (M+H)

$^1$H-NMR (400 MHz) 3.4-3.6 (m, 4H) 4.20 (m, 2H) 5.34 (brs, 2H) 5.74 (m, 2H) 5.88 (m, 2H) 6.11-6.18 (m, 4H) 6.4-6.5 (m, 4H) 7.54 (s, 2H)

(Synthesis of Compound Represented by Formula (1-16))

First, 23.9 g of 1,1-(bisacryloyloxymethyl)ethyl isocyanate and 0.03 g of 4-methoxyphenol were put into a four-necked flask to be thereby mixed together. Thereafter, while stirring the mixture at room temperature, 11.5 g of N-(2-hydroxyethyl)acrylamide was dropped into the mixture over one hour. Thereafter, the four-necked flask was heated to thereby increase the temperature of the mixture to 80° C. over one hour, following which the mixture was stirred at the same temperature for one hour. This caused the mixture to react, and a product was obtained. Here, the product was analyzed by FT-IR. As a result, there was no isocyanate group left. Accordingly, it was confirmed that the reaction of the mixture was completed. Lastly, the product was cooled until the temperature of the product reached room temperature. Thus, 34.9 g of a colorless oil was obtained.

The product was analyzed by LC/MS and NMR. As a result, it was confirmed that the product was the compound represented by Formula (1-16). Details of the analytical result of the product are as follows.

MS m/z: 355 (M+H)

$^1$H-NMR (400 MHz) 1.42 (s, 3H) 3.5 (m, 2H) 4.19 (t, 2H) 4.36 (m, 4H) 5.22 (brs, 1H) 5.65 (m, 1H) 5.87 (m, 2H) 6.05-6.17 (m, 3H) 6.25-6.30 (m, 2H) 6.3-6.4 (brs, 1H) 6.45 (m, 1H)

[Preparation of Polymerizable Composition]

The amide compound and the polymerization initiator were added to 150 parts by mass of an aqueous solvent, following which the aqueous solvent was stirred. As the aqueous solvent, ion-exchanged water (water), methanol (MeOH), propylene glycol monomethyl ether (PGM), and diacetone alcohol (DAA) were used. Thereafter, a leveling agent was further added to the aqueous solvent. In addition, the polyfunctional acrylamide compound, the monofunctional acrylamide compound, the polyfunctional acrylic acid ester, and the monofunctional acrylic acid ester were further added on an as-needed basis. As a result, the coating agent which is a liquid polymerizable composition was prepared.

As the amide compound, the above-described five kinds of compounds, i.e., the respective compounds represented by Formulae (1-1) to (1-3), (1-6), (1-10), and (1-16), were used.

As the polymerization initiator (the water-soluble polymerization initiator), N,N-bis(2-hydroxyethyl)butane-1-aminium=phenyl(2,4,6-trimethylbenzoyl)phosphinate represented by A3, 1-[4-(2-hydroxyethoxy)phenyl]-2-hydroxy-2-methyl-1-propan-1-one represented by A32, and N,N-bis(2-hydroxyethyl)butane-1-aminium=9-oxo-9H thioxanthene-4-carboxylate represented by A57 were used. These water-soluble polymerization initiators each exhibited solubility of 1 mass % or more in water (ion-exchanged water) at 25° C.

As the polyfunctional acrylamide compound, respective compounds represented by Formulae (3-1) to (3-3) and N,N'-diacryloyl-4,7,10trioxa -1,13-tridecanediamine (NTDA) were used. As the monofunctional acrylamide compound, 4-acryloylmorpholine (4AM) and N-(2-hydroxyethyl) acrylamide (HEAA) were used.

[Chem. 15]

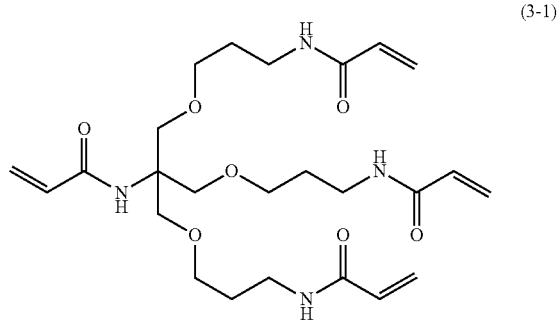

(3-1)

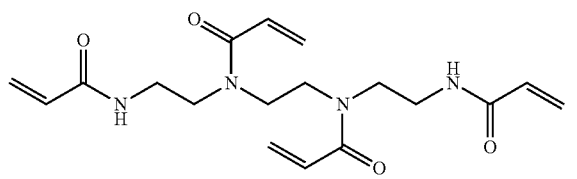

(3-2)

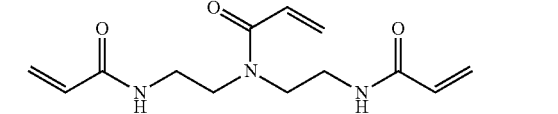

(3-3)

As the polyfunctional acrylic acid ester, high hydroxyl value pentaerythritol acrylate (a mixture of pentaerythritol triacrylate and pentaerythritol tetraacrylate) ARONIX (registered trademark) MT-3548 (PETA) available from Toagosei Co., Ltd., high hydroxyl value glycerin diacrylate (a mixture of glycerin diacrylate and glycerin triacrylate) ARONIX (registered trademark) MT-3560 (GRA) available from Toagosei Co., Ltd., ethylene oxide modified polyglycerin polyacrylate SA-TE60 (EOPG) available from Sakamoto Yakuhin Kogyo Co., Ltd., and phenylglycidyl ether acrylate hexamethylene diisocyanate urethane prepolymer AH-600 (PGEA) available from Kyoeisha Chemical Co., Ltd. were used.

As the monofunctional acrylic ester, methoxypolyethylene glycol monoacrylate AM-90G (MPEG) available from Shin-Nakamura Chemical Co., Ltd. was used.

As the leveling agent, a polyether modified polysiloxane copolymer TEGO Glide 440 available from Evonik Japan Co., Ltd. was used.

Respective mixture ratios (mass ratios) of the amide compound, the polymerization initiator, the polyfunctional acrylamide compound, the monofunctional acrylamide compound, the polyfunctional acrylic acid ester, and the monofunctional acrylic acid ester were as listed in Tables 1 to 3. Note that a mixture ratio (mass ratio) of the leveling agent was 0.25 parts by mass.

TABLE 1

| Experiment example | Amide compound Kind | Amide compound Mixture ratio | Polymerization initiator Kind | Polymerization initiator Mixture ratio | Polyfunctional acrylamide compound Kind | Polyfunctional acrylamide compound Mixture ratio | Monofunctional acrylamide compound Kind | Monofunctional acrylamide compound Mixture ratio | Polyfunctional acrylic acid ester Kind | Polyfunctional acrylic acid ester Mixture ratio | Monofunctional acrylic acid ester Kind | Monofunctional acrylic acid ester Mixture ratio | Solvent Kind | Solvent Mixture ratio | Transparency | Coatability | Adherence | Hardness |
|---|---|---|---|---|---|---|---|---|---|---|---|---|---|---|---|---|---|---|
| 1 | (1-1) | 100 | A3 | 5 | — | — | — | — | — | — | — | — | Water | 150 | B | A | A | 2 H |
| 2 | (1-1) | 50 | A3 | 5 | — | — | 4 AM | 50 | — | — | — | — | Water | 150 | A | A | A | 2 H |
| 3 | (1-2) | 50 | A3 | 5 | — | — | 4 AM | 50 | — | — | — | — | Water | 150 | A | A | A | 2 H |
| 4 | (1-3) | 50 | A3 | 5 | — | — | 4 AM | 50 | — | — | — | — | Water | 150 | A | A | A | 2 H |
| 5 | (1-6) | 50 | A3 | 5 | — | — | 4 AM | 50 | — | — | — | — | Water | 150 | A | A | A | 2 H |
| 6 | (1-10) | 50 | A3 | 5 | — | — | 4 AM | 50 | — | — | — | — | Water | 150 | B | A | A | 2 H |
| 7 | (1-16) | 50 | A3 | 5 | — | — | 4 AM | 50 | — | — | — | — | Water | 150 | B | A | A | 2 H |
| 8 | (1-1) | 50 | A3 | 5 | (3-1) | 50 | — | — | — | — | — | — | Water | 150 | A | A | A | 3 H |
| 9 | (1-1) | 50 | A3 | 5 | — | — | 4 AM | 50 | — | — | — | — | Water | 150 | A | A | A | 2 H |
| 10 | (1-1) | 50 | A3 | 5 | — | — | 4 AM | 50 | — | — | — | — | — | — | A | A | A | 2 H |
| 11 | (1-1) | 50 | A3 | 5 | — | — | 4 AM | 50 | — | — | — | — | MeOH | 150 | A | A | A | 2 H |
| 12 | (1-1) | 50 | A3 | 5 | — | — | 4 AM | 50 | — | — | — | — | PGM | 150 | A | A | A | 2 H |
| 13 | (1-1) | 50 | A3 | 5 | — | — | 4 AM | 50 | — | — | — | — | DAA | 150 | A | A | A | 2 H |
| 14 | (1-1) | 50 | A32 | 5 | — | — | 4 AM | 50 | — | — | — | — | PGM | 150 | A | A | A | 2 H |

TABLE 2

| Experiment example | Amide compound Kind | Amide compound Mixture ratio | Polymerization initiator Kind | Polymerization initiator Mixture ratio | Polyfunctional acrylamide compound Kind | Polyfunctional acrylamide compound Mixture ratio | Monofunctional acrylamide compound Kind | Monofunctional acrylamide compound Mixture ratio | Polyfunctional acrylic acid ester Kind | Polyfunctional acrylic acid ester Mixture ratio | Monofunctional acrylic acid ester Kind | Monofunctional acrylic acid ester Mixture ratio | Solvent Kind | Solvent Mixture ratio | Transparency | Coatability | Adherence | Hardness |
|---|---|---|---|---|---|---|---|---|---|---|---|---|---|---|---|---|---|---|
| 15 | (1-1) | 50 | A3 | 5 | (3-1) | 25 | 4 AM | 25 | — | — | — | — | Water | 150 | A | A | A | 3 H |
| 16 | (1-1) | 50 | A3 | 5 | (3-2) | 25 | 4 AM | 25 | — | — | — | — | Water | 150 | A | A | A | 3 H |
| 17 | (1-1) | 50 | A3 | 5 | (3-3) | 25 | 4 AM | 25 | — | — | — | — | Water | 150 | A | A | A | 3 H |
| 18 | (1-1) | 50 | A3 | 5 | — | — | — | — | PETA | 50 | — | — | MeOH | 150 | A | A | A | 2 H |
| 19 | (1-1) | 50 | A3 | 5 | — | — | — | — | GRA | 50 | — | — | MeOH | 150 | A | A | A | 2 H |
| 20 | (1-1) | 3 | A3 | 5 | (3-1) | 50 | 4 AM | 47 | — | — | — | — | Water | 150 | A | A | A | H |
| 21 | (1-1) | 80 | A3 | 5 | — | — | 4 AM | 20 | — | — | — | — | Water | 150 | A | A | A | 3 H |
| 22 | (1-1) | 10 | A3 | 5 | — | — | 4 AM | 90 | — | — | — | — | Water | 150 | A | A | A | H |
| 23 | (1-1) | 80 | A3 | 0.1 | — | — | 4 AM | 20 | — | — | — | — | Water | 150 | A | A | A | H |
| 24 | (1-1) | 80 | A3 | 15 | — | — | 4 AM | 20 | — | — | — | — | Water | 150 | A | A | A | 3 H |
| 25 | (1-1) | 50 | A3 | 5 | (3-1) | 25 | — | — | — | — | MPEG | 25 | Water | 150 | A | A | A | 2 H |
| 26 | (1-1) | 80 | A3 | 5 | — | — | — | — | — | — | MPEG | 20 | Water | 150 | A | A | A | 2 H |
| 27 | (1-1) | 50 | A3 | 5 | (3-1) | 25 | — | — | EOPG | 25 | — | — | Water | 150 | A | A | A | 2 H |
| 28 | (1-1) | 80 | A3 | 5 | — | — | — | — | EOPG | 20 | — | — | Water | 150 | A | A | A | 3 H |
| 29 | (1-1) | 50 | A3 + A57 | 5 + 1 | (3-1) | 25 | 4 AM | 25 | — | — | — | — | Water | 150 | A | A | A | 3 H |

TABLE 3

| Experiment example | Amide compound Kind | Amide compound Mixture ratio | Polymerization initiator Kind | Polymerization initiator Mixture ratio | Polyfunctional acrylamide compound Kind | Polyfunctional acrylamide compound Mixture ratio | Monofunctional acrylamide compound Kind | Monofunctional acrylamide compound Mixture ratio | Polyfunctional acrylic acid ester Kind | Polyfunctional acrylic acid ester Mixture ratio | Monofunctional acrylic acid ester Kind | Monofunctional acrylic acid ester Mixture ratio | Solvent Kind | Solvent Mixture ratio | Transparency | Coatability | Adherence | Hardness |
|---|---|---|---|---|---|---|---|---|---|---|---|---|---|---|---|---|---|---|
| 30 | (1-1) | 80 | A3 | 5 | — | — | HEAA | 20 | — | — | — | — | Water | 150 | A | A | A | 2 H |
| 31 | (1-1) | 50 | A3 | 5 | — | — | HEAA | 50 | — | — | — | — | Water | 150 | A | A | A | 2 H |
| 32 | (1-1) | 20 | A3 | 5 | — | — | HEAA | 80 | — | — | — | — | Water | 150 | A | A | A | H |
| 33 | (1-1) | 50 | A3 | 5 | — | — | HEAA | 50 | — | — | — | — | MeOH | 150 | A | A | A | H |
| 34 | (1-1) | 50 | A3 | 5 | — | — | HEAA | 50 | — | — | — | — | DAA | 150 | A | A | A | 2 H |
| 35 | (1-1) | 50 | A3 | 5 | — | — | HEAA | 50 | — | — | — | — | PGM | 150 | A | A | A | 2 H |
| 36 | — | — | A3 | 5 | (3-1) | 50 | 4 AM | 50 | — | — | — | — | Water | 150 | C | — | — | — |
| 37 | — | — | A3 | 5 | (3-2) | 50 | 4 AM | 50 | — | — | — | — | Water | 150 | C | | | |

TABLE 3-continued

| Experiment example | Amide compound Kind | Amide compound Mixture ratio | Polymerization initiator Kind | Polymerization initiator Mixture ratio | Polyfunctional acrylamide compound Kind | Polyfunctional acrylamide compound Mixture ratio | Monofunctional acrylamide compound Kind | Monofunctional acrylamide compound Mixture ratio | Polyfunctional acrylic acid ester Kind | Polyfunctional acrylic acid ester Mixture ratio | Monofunctional acrylic acid ester Kind | Monofunctional acrylic acid ester Mixture ratio | Solvent Kind | Solvent Mixture ratio | Transparency | Coatability | Adherence | Hardness |
|---|---|---|---|---|---|---|---|---|---|---|---|---|---|---|---|---|---|---|
| 38 | — | — | A3 | 5 | (3-3) | 50 | 4 AM | 50 | — | — | — | — | Water | 150 | C | — | — | — |
| 39 | — | — | A3 | 5 | NTDA | 50 | 4 AM | 50 | — | — | — | — | Water | 150 | C | — | — | — |
| 40 | — | — | A3 | 5 | — | — | 4 AM | 50 | PETA | 50 | — | — | Water | 150 | C | — | — | — |
| 41 | — | — | A3 | 5 | — | — | 4 AM | 50 | GRA | 50 | — | — | Water | 150 | C | — | — | — |
| 42 | — | — | A3 | 5 | — | — | — | — | GRA | 100 | — | — | MeOH | 150 | B | A | B | F |
| 43 | — | — | A3 | 5 | — | — | 4 AM | 50 | PGEA | 50 | — | — | DAA | 150 | B | A | B | HB |

[Evaluation of Physical Properties]

Evaluation of physical properties, i.e., storage stability (transparency) and coatability, of the polymerizable compositions and physical properties, i.e., adherence and hardness, of the cured material revealed results described in Tables 1 to 3.

(Transparency)

In a case of examining the transparency, the coating agent was heated at a heating temperature of 80° C. for a heating time of 30 minutes, following which the coating agent was allowed to stand until its temperature returned to room temperature. Thereafter, a state (an appearance) of the coating agent was visually observed to thereby determine the state. In this case, a case where the color of the coating agent was transparent was determined as A. A case where haze occurred in the coating agent was determined as B. A case where the coating agent was cloudy was determined as C. A polymerizable composition having a determination result of A or B is suitable for actual use, and a polymerizable composition having a determination result of A is particularly suitable for actual use, whereas a polymerizable composition having a determination result of C is not suitable for actual use.

(Coatability)

In a case of examining the coatability, the coating agent was applied onto a surface of a base with use of a bar coater, following which the applied coating agent was heated and dried at a heating temperature of 80° C. for a heating time of two minutes to thereby form a coating film. As the base, easily adherable PET (a biaxially oriented PET film COSMOSHINE A4300 available from Toyobo Co., Ltd.) was used. Thereafter, a state (an appearance) of the coating film was visually observed to thereby determine the state. In this case, a case where the state of the coating film was entirely uniform was determined as A. A case where the state of the coating film was almost uniform but the coating agent was repelled in a portion of the coating film was determined as B. A case where the coating agent was repelled in the entire coating film was determined as C. A polymerizable composition having a determination result of A or B is suitable for actual use, and a polymerizable composition having a determination result of A is particularly suitable for actual use, whereas a polymerizable composition having a determination result of C is not suitable for actual use.

(Adherence)

In a case of examining the adherence, first, a coating film was formed on the surface of the base (easily adherable PET) with use of the coating agent by a procedure similar to that in the case of examining the coatability. Thereafter, the coating film was irradiated with an active energy ray, i.e., an ultraviolet ray having a wavelength from 320 nm to 390 nm both inclusive, at an irradiation amount of 350 mJ/cm$^2$ for an irradiation time of 1 second. This caused a polymerization (curing) reaction of the amide compound in the coating agent, resulting in formation of a film including a cured material of the amide compound. Thereafter, a surface of the film was cut in a cross shape with use of a cutter. Lastly, an adhesive tape (Cellotape (registered trademark) CT-18 available from Nichiban Co., Ltd.) was attached to the surface of the film, following which the adhesive tape was peeled off fast. Thereafter, a state of the film (the cured material) after peeling off the tape was visually observed to thereby determine the state. In this case, a case where the film was not peeled off at all was determined as A. A case where the film was partially peeled off was determined as B. A case where the entire film was peeled off was determined as C. A polymerizable composition having a determination result of A or B is suitable for actual use, and a polymerizable composition having a determination result of A is particularly suitable for actual use, whereas a polymerizable composition having a determination result of C is not suitable for actual use.

(Hardness)

In a case of examining the hardness, a film (a cured material) was formed on the surface of the base (easily adherable PET) by a procedure similar to that in the case of examining the adherence, following which a pencil was moved on the film for a moving distance of 10 mm while pressing the pencil against the surface of the film at a load of 750 g and at a pressing angle of 45°. Thereafter, it was visually confirmed whether or not the surface of the film was damaged due to the pressing pencil. If the surface of the film was not damaged due to the pressing pencil, the pencil was changed to a harder pencil, and the operation of moving the pencil was repeated again in a similar manner. As a result, the maximum hardness of the pencil in a case where the surface of the film was not damaged was identified. The maximum hardness of the pencil is preferably H or harder, more preferably 2H or harder, and particularly preferably 3H or harder. Note that in a case where the maximum hardness of the pencil is less than H, it is not possible to form a film having sufficient hardness within an allowable range.

Discussion

As described in Tables 1 to 3, the physical properties of the coating agent (the liquid polymerizable composition) and the physical properties of the cured material varied greatly depending on the configuration of the coating agent.

Specifically, in a case where the coating agent included no amide compound (Experiment examples 36 to 43), the transparency was not secured in most cases although there were some cases where the transparency was secured. In addition, even if the transparency was secured, the adherence was insufficient and the hardness was markedly lowered, although the coatability was ensured. Note that in a case where the transparency was not secured, the coatability, the adherence, and the hardness were not evaluated because the storage stability of the coating agent was not secured in the first place.

In contrast, in a case where the coating agent included the amide compound (Experiment examples 1 to 35), the transparency was secured, and the coatability, the adherence, and the hardness were also secured.

In this case, in particular, if the coating agent included one or more of the polyfunctional acrylamide compound, the monofunctional acrylamide compound, the polyfunctional acrylic acid ester, and the monofunctional acrylic acid ester (e.g., Experiment examples 2, 8, 18, and 25), the transparency further improved, and in some cases, the hardness also further improved.

CONCLUSION

Based upon the results described in Tables 1 to 3, the use of the polymerizable composition including the amide compound and the polymerization initiator achieved, owing to the superior physical properties of the amide compound, superior storage stability (transparency) and superior coatability of the polymerizable composition, and also achieved superior adherence and superior hardness of the cured material manufactured using the polymerizable composition. Further, irradiation of the above-described polymerizable composition with the active energy ray allowed for manufacturing of the cured material having superior adherence and superior hardness. Accordingly, superior physical properties of each of the amide compound, the polymerizable composition, and the cured material were obtained, and a cured material having superior physical properties was obtained by the method of manufacturing the cured material.

Although the present invention has been described above with reference to some embodiments and Examples, the present invention is not limited to the examples described with reference to the embodiments and Examples above and is modifiable in a variety of ways.

Specifically, the above description refers to a case where the polymerizable composition includes a solvent, and the polymerizable composition is therefore used as a liquid polymerizable composition (a coating agent); however, the example of the use of the polymerizable composition is not particularly limited. Specifically, the polymerizable composition may include no solvent, and the polymerizable composition may be therefore used as a solid polymerizable composition.

This application claims the priority on the basis of Japanese Patent Application No. 2019-124272 filed on Jul. 3, 2019 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A polymerizable composition comprising:
an amide compound represented by Formula (1); and
a polymerization initiator,

[Chem. 1]

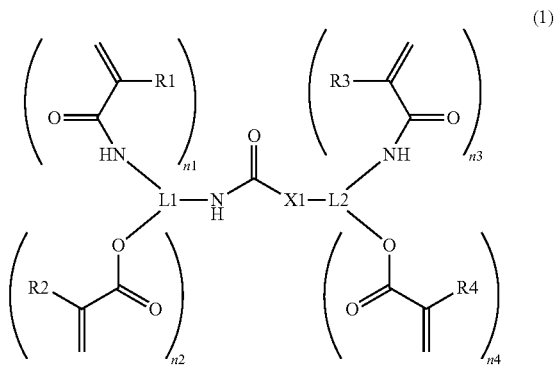

where

L1 is one of an (n1+n2+1)-valent unsubstituted hydrocarbon group, an (n1+n2+1)-valent unsubstituted heterocyclic group, an (n1+n2+1)-valent substituted hydrocarbon group, and an (n1+2+1)-valent substituted heterocyclic group, L2 is one of an (n3+n4+1)-valent unsubstituted hydrocarbon group, an (n3+n4+1)-valent unsubstituted heterocyclic group, an (n3+n4+1)-valent substituted hydrocarbon group, and an (n3+n4+1)-valent substituted heterocyclic group, X1 is one of —O—, —S—, and a single bond, each of R1, R2, R3, and R4 is one of a hydrogen group and a monovalent unsubstituted hydrocarbon group, each of n1, n2, n3, and n4 is an integer of greater than or equal to 0 and less than or equal to 5, the (n1+n2+1)-valent substituted hydrocarbon group and the (n3+n4+1)-valent substituted hydrocarbon group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or a divalent linking group represented by each of Formulae (2-1) to (2-8) into an (n1+n2+1)-valent unsubstituted hydrocarbon group and an (n3+n4+1)-valent unsubstituted hydrocarbon group, respectively, the (n1+n2+1)-valent substituted heterocyclic group and the (n3+n4+1)-valent substituted heterocyclic group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (2-1) to (2-8) into an (n1+n2+1)-valent unsubstituted heterocyclic group and an (n3+n4+1)-valent unsubstituted heterocyclic group, respectively, and n1, n2, n3, and n4 satisfy (n1+n2+n3+n4)≥2, and satisfy (n1+n3)≥1 and (n2+n4)≥1,

[Chem. 2]

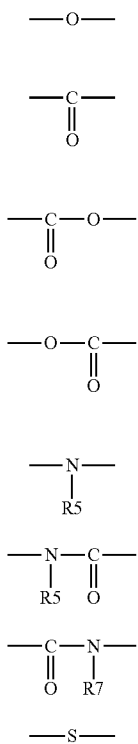

(2-1) —O—

(2-2) —C(=O)—

(2-3) —C(=O)—O—

(2-4) —O—C(=O)—

(2-5) —N(R5)—

(2-6) —N(R5)—C(=O)—

(2-7) —C(=O)—N(R7)—

(2-8) —S— where each of R5, R6, and R7 is one of a monovalent unsubstituted hydrocarbon group, a monovalent unsubstituted heterocyclic group, a monovalent substituted hydrocarbon group, and a monovalent substituted heterocyclic group.

2. The polymerizable composition according to claim 1, wherein the X1 is —O—.

3. The polymerizable composition according to claim 1, wherein the n1, the n2, the n3, and the n4 satisfy (n1+2+n3+n4)=2.

4. The polymerizable composition according to claim 1, wherein
each of the (n1+n2+1)-valent unsubstituted hydrocarbon group and the (n3+n4+1)-valent unsubstituted hydrocarbon group has carbon number of greater than or equal to 1 and less than or equal to 30, and
each of the (n1+n2+1)-valent unsubstituted heterocyclic group and the (n3+n4+1)-valent unsubstituted heterocyclic group has carbon number of greater than or equal to 2 and less than or equal to 30.

5. The polymerizable composition according to claim 1, wherein each of the R1, the R2, the R3, and the R4 is a hydrogen group.

6. The polymerizable composition according to claim 1, further comprising
a polyfunctional acrylamide compound having two or more groups represented by Formula (3) in a molecule, a monofunctional acrylamide compound represented by Formula (4), or both,

[Chem. 3]

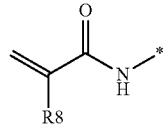

(3)

where
R8 is one of a hydrogen group and a monovalent unsubstituted hydrocarbon group, and
"*" represents a dangling bond,

[Chem. 4]

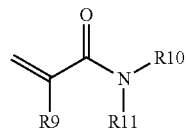

(4)

where
R9 is one of a hydrogen group and a monovalent unsubstituted hydrocarbon group,
each of R10 and R11 is one of a hydrogen group, a monovalent unsubstituted hydrocarbon group, a monovalent unsubstituted heterocyclic group, a monovalent substituted hydrocarbon group, and a monovalent substituted heterocyclic group,
R10 and R11 are bondable to each other to form a ring,
the monovalent substituted hydrocarbon group is a group obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or the divalent linking group represented by each of Formulae (2-1) to (2-8) into a monovalent unsubstituted hydrocarbon group, and
the monovalent substituted heterocyclic group is a group obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (2-1) to (2-8) into a monovalent unsubstituted heterocyclic group.

7. The polymerizable composition according to claim 1, further comprising an aqueous solvent.

8. The polymerizable composition according to claim 7, wherein the polymerization initiator comprises a water-soluble polymerization initiator that dissolves by 1 percent by mass or more in water at 25 degrees Celsius.

9. A cured material that is a cured product of the polymerizable composition according to claim 1.

10. A method of manufacturing a cured material, the method comprising irradiating the polymerizable composition according to claim 1 with an active energy ray.

11. An amide compound represented by Formula (5),

[Chem. 5]

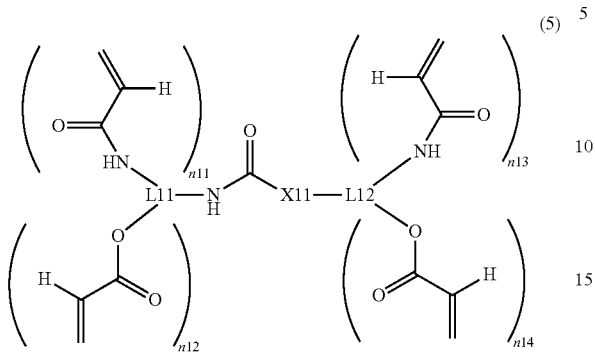

where
L11 is one of an (n11+n12+1)-valent unsubstituted hydrocarbon group, an (n11+n12+1)-valent unsubstituted heterocyclic group, an (n11+n12+1)-valent substituted hydrocarbon group, and an (n11+n12+1)-valent substituted heterocyclic group,
L12 is one of an (n13+n14+1)-valent unsubstituted hydrocarbon group, an (n13+n14+1)-valent unsubstituted heterocyclic group, an (n13+n14+1)-valent substituted hydrocarbon group, and an (n13+n14+1)-valent substituted heterocyclic group,
X11 is one of —O—, —S—, and a single bond,
each of n11, n12, n13, and n14 is an integer of greater than or equal to 0 and less than or equal to 5,
the (n11+n12+1)-valent substituted hydrocarbon group and the (n13+n14+1)-valent substituted hydrocarbon group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted heterocyclic group, or a divalent linking group represented by each of Formulae (6-1) to (6-8) into an (n11+n12+1)-valent unsubstituted hydrocarbon group and an (n13+n14+1)-valent unsubstituted hydrocarbon group, respectively,
the (n11+n12+1)-valent substituted heterocyclic group and the (n13+n14+1)-valent substituted heterocyclic group are groups obtained by introducing at least one of a halogen group, a nitro group, a cyano group, a hydroxyl group, an amino group, a carboxyl group, a methacryloyl group, an acryloyl group, an epoxy group, a vinyl ether group, a mercapto group, an isocyanate group, a monovalent unsubstituted hydrocarbon group, or the divalent linking group represented by each of Formulae (6-1) to (6-8) into an (n11+n12+1)-valent unsubstituted heterocyclic group and an (n13+n14+1)-valent unsubstituted heterocyclic group, respectively, and
n11, n12, n13, and n14 satisfy (n11+n12+n13+n14)≥2, and satisfy (n11+n13)≥1 and (n12+n14)≥1,

[Chem. 6]

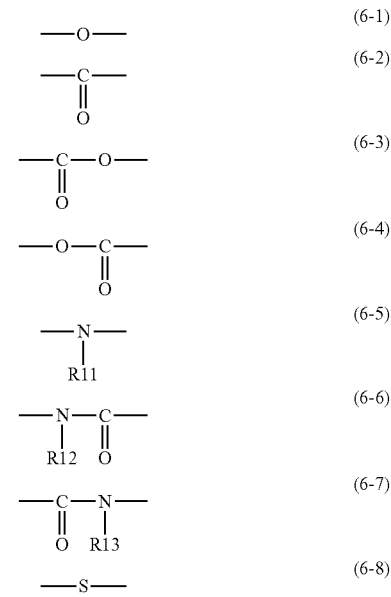

where each of R11, R12, and R13 is one of a monovalent unsubstituted hydrocarbon group, a monovalent unsubstituted heterocyclic group, a monovalent substituted hydrocarbon group, and a monovalent substituted heterocyclic group.

12. The polymerizable composition according to claim 1, wherein the carbon number of the (n1+n2+1)-valent substituted hydrocarbon group represented by L1 is from 1 to 8 both inclusive, and the carbon number of the (n3+n4+1)-valent substituted hydrocarbon group represented by L2 is from 1 to 8 both inclusive.

13. The amide compound according to claim 11, wherein the carbon number of the (n11+n12+1)-valent substituted hydrocarbon group represented by L11 is from 1 to 8 both inclusive, and the carbon number of the (n13+n14+1)-valent substituted hydrocarbon group represented by L12 is from 1 to 8 both inclusive.

* * * * *